US006707557B2

(12) United States Patent
Young, Jr. et al.

(10) Patent No.: US 6,707,557 B2
(45) Date of Patent: Mar. 16, 2004

(54) METHOD AND SYSTEM FOR ESTIMATING SENSOR DARK CURRENT DRIFT AND SENSOR/ILLUMINATION NON-UNIFORMITIES

(75) Inventors: Robert S. Young, Jr., Austin, TX (US); Richard D. Ball, Austin, TX (US); Mark S. Bishop, Austin, TX (US); Marc C. Digby, Austin, TX (US); Christopher P. Hansen, Indianapolis, IN (US); Clyde W. Hinkle, II, Austin, TX (US); Philip E. Cannata, Austin, TX (US)

(73) Assignee: Eastman Kodak Company, Rochester, NY (US)

( * ) Notice: Subject to any disclaimer, the term of this patent is extended or adjusted under 35 U.S.C. 154(b) by 461 days.

(21) Appl. No.: 09/753,431

(22) Filed: Jan. 2, 2001

(65) Prior Publication Data

US 2001/0030750 A1 Oct. 18, 2001

Related U.S. Application Data

(60) Provisional application No. 60/173,780, filed on Dec. 30, 1999, and provisional application No. 60/174,074, filed on Dec. 30, 1999.

(51) Int. Cl.[7] .............................................. G01N 21/86

(52) U.S. Cl. ...................................................... 356/444

(58) Field of Search ......................................... 356/444

(56) References Cited

U.S. PATENT DOCUMENTS

| 2,404,138 A | 7/1946 | Mayer ............................. 95/94 |
| 3,520,689 A | 7/1970 | Nagae et al. .................. 96/55 |
| 3,520,690 A | 7/1970 | Nagae et al. .................. 96/55 |

(List continued on next page.)

FOREIGN PATENT DOCUMENTS

EP        0 261 782 A2    8/1987    ............ H04N/1/46

(List continued on next page.)

OTHER PUBLICATIONS

"Adaptive Fourier Threshold Filtering: A Method to Reduce Noise and Incoherent Artifacts in High Resolution Cardiac Images", Doyle, M., et al., 8306 Magnetic Resonance in Medicine 31, No. 5, Baltimore, MD, May, 1994, pp. 546–550.

"Anisotropic Spectral Magnitude Estimation Filters for Noise Reduction and Image Enhancement", T. Aach, et al., Philips GmbH Research Laboratories, IEEE, pp. 335–338, 1996.

(List continued on next page.)

*Primary Examiner*—Richard A. Rosenberger
(74) *Attorney, Agent, or Firm*—Simon, Galasso & Frantz; David A. Novais

(57) ABSTRACT

One aspect of the present invention is a system for estimating sensor and illumination non-uniformities. The system comprises a first light source, and a first sensor operable to capture light reflected from a first side of film illuminated by the light source while the film has a developer chemical applied thereto and processing circuitry coupled to the first sensor. The processing circuitry is operable to capture a first plurality of readings from the sensor responsive to light reflected from an unexposed region of film to determine a first set of non-uniformity data and adjust image data obtained from the film in response to the first set of non-uniformity data. In a further embodiment, the processing circuitry is further operable to dim the first light source for at least a portion of the time that the sensor is being used to sense the unexposed region of the film. The processing circuitry may also capture a second plurality of readings from the sensor while the first light source is dimmed to determine a second set of non-uniformity data and adjust image data obtained from the film in response to the second set of non-uniformity data.

22 Claims, 13 Drawing Sheets

U.S. PATENT DOCUMENTS

| | | | | |
|---|---|---|---|---|
| 3,587,435 | A | 6/1971 | Chioffe | 95/93 |
| 3,615,479 | A | 10/1971 | Kohler et al. | 96/48 |
| 3,615,498 | A | 10/1971 | Aral et al. | 96/55 |
| 3,617,282 | A | 11/1971 | Bard et al. | 96/59 |
| 3,747,120 | A | 7/1973 | Stemme | 346/75 |
| 3,833,161 | A | 9/1974 | Krumbein | 226/92 |
| 3,903,541 | A | 9/1975 | Von Meister et al. | 354/317 |
| 3,946,398 | A | 3/1976 | Kyser et al. | 346/1 |
| 3,959,048 | A | 5/1976 | Stanfield et al. | 156/94 |
| 4,026,756 | A | 5/1977 | Stanfield et al. | 156/554 |
| 4,081,577 | A | 3/1978 | Horner | 427/424 |
| 4,142,107 | A | 2/1979 | Hatzakis et al. | 250/571 |
| 4,215,927 | A | 8/1980 | Grant et al. | 354/317 |
| 4,249,985 | A | 2/1981 | Stanfield | 156/554 |
| 4,265,545 | A | 5/1981 | Slaker | 356/431 |
| 4,301,469 | A | 11/1981 | Modeen et al. | 358/75 |
| 4,345,831 | A * | 8/1982 | Kachelries | 356/444 |
| 4,490,729 | A | 12/1984 | Clark et al. | 346/75 |
| 4,501,480 | A | 2/1985 | Matsui et al. | 354/298 |
| 4,564,280 | A | 1/1986 | Fukuda | 354/317 |
| 4,594,598 | A | 6/1986 | Iwagami | 346/140 |
| 4,621,037 | A | 11/1986 | Kanda et al. | 430/30 |
| 4,623,236 | A | 11/1986 | Stella | 354/318 |
| 4,633,300 | A | 12/1986 | Sakai | 358/41 |
| 4,636,808 | A | 1/1987 | Herron | 346/75 |
| 4,666,307 | A | 5/1987 | Matsumoto et al. | 356/404 |
| 4,670,779 | A | 6/1987 | Nagano | 358/75 |
| 4,736,221 | A | 4/1988 | Shidara | 354/317 |
| 4,741,621 | A | 5/1988 | Taft et al. | 356/376 |
| 4,745,040 | A | 5/1988 | Levine | 430/21 |
| 4,755,844 | A | 7/1988 | Tsuchiya et al. | 354/317 |
| 4,777,102 | A | 10/1988 | Levine | 430/21 |
| 4,796,061 | A | 1/1989 | Ikeda et al. | 355/73 |
| 4,814,630 | A | 3/1989 | Lim | 250/578 |
| 4,821,114 | A | 4/1989 | Gebhardt | 358/75 |
| 4,845,551 | A | 7/1989 | Matsumoto | 358/80 |
| 4,851,311 | A | 7/1989 | Millis et al. | 430/30 |
| 4,857,430 | A | 8/1989 | Millis et al. | 430/30 |
| 4,875,067 | A | 10/1989 | Kanzaki et al. | 354/325 |
| 4,969,045 | A | 11/1990 | Haruki et al. | 358/228 |
| 4,994,918 | A | 2/1991 | Lingemann | 358/214 |
| 5,027,146 | A | 6/1991 | Manico et al. | 354/299 |
| 5,034,767 | A | 7/1991 | Netz et al. | 354/317 |
| 5,101,286 | A | 3/1992 | Patton | 358/487 |
| 5,124,216 | A | 6/1992 | Giapis et al. | 430/30 |
| 5,155,596 | A | 10/1992 | Kurtz et al. | 358/214 |
| 5,196,285 | A | 3/1993 | Thomson | 430/30 |
| 5,200,817 | A | 4/1993 | Birnbaum | 358/80 |
| 5,212,512 | A | 5/1993 | Shiota | 354/319 |
| 5,231,439 | A | 7/1993 | Takahashi et al. | 354/313 |
| 5,235,352 | A | 8/1993 | Pies et al. | 346/140 |
| 5,255,408 | A | 10/1993 | Blackman | 15/308 |
| 5,266,805 | A | 11/1993 | Edgar | 250/330 |
| 5,267,030 | A | 11/1993 | Giorgianni et al. | 358/527 |
| 5,292,605 | A | 3/1994 | Thomson | 430/30 |
| 5,296,923 | A | 3/1994 | Hung | 358/527 |
| 5,334,247 | A | 8/1994 | Columbus et al. | 118/411 |
| 5,350,651 | A | 9/1994 | Evans et al. | 430/21 |
| 5,350,664 | A | 9/1994 | Simons | 430/362 |
| 5,357,307 | A | 10/1994 | Glanville et al. | 354/324 |
| 5,360,701 | A | 11/1994 | Elton et al. | 430/501 |
| 5,371,542 | A | 12/1994 | Pauli et al. | 348/262 |
| 5,391,443 | A | 2/1995 | Simons et al. | 430/21 |
| 5,414,779 | A | 5/1995 | Mitch | 382/199 |
| 5,416,550 | A | 5/1995 | Skye et al. | 354/298 |
| 5,418,119 | A | 5/1995 | Simons | 430/507 |
| 5,418,597 | A | 5/1995 | Lahcanski et al. | 355/76 |
| 5,432,579 | A | 7/1995 | Tokuda | 354/293 |
| 5,436,738 | A | 7/1995 | Manico | 358/503 |
| 5,440,365 | A | 8/1995 | Gates et al. | 354/298 |
| 5,447,811 | A | 9/1995 | Buhr et al. | 430/20 |
| 5,448,380 | A | 9/1995 | Park | 358/520 |
| 5,452,018 | A | 9/1995 | Capitant et al. | 348/651 |
| 5,465,155 | A | 11/1995 | Edgar | 358/500 |
| 5,477,345 | A | 12/1995 | Tse | 358/500 |
| 5,496,669 | A | 3/1996 | Pforr et al. | 430/22 |
| 5,516,608 | A | 5/1996 | Hobbs et al. | 430/30 |
| 5,519,510 | A | 5/1996 | Edgar | 358/471 |
| 5,546,477 | A | 8/1996 | Knowles et al. | 382/242 |
| 5,550,566 | A | 8/1996 | Hodgson et al. | 345/202 |
| 5,552,904 | A | 9/1996 | Ryoo et al. | 358/518 |
| 5,563,717 | A | 10/1996 | Koeng et al. | 358/406 |
| 5,568,270 | A | 10/1996 | Endo | 358/298 |
| 5,576,836 | A | 11/1996 | Sano et al. | 358/302 |
| 5,581,376 | A | 12/1996 | Harrington | 358/518 |
| 5,587,752 | A | 12/1996 | Petruchik | 396/315 |
| 5,596,415 | A | 1/1997 | Cosgrove et al. | 358/296 |
| 5,627,016 | A | 5/1997 | Manico | 430/434 |
| 5,649,260 | A | 7/1997 | Wheeler et al. | 396/569 |
| 5,664,253 | A | 9/1997 | Meyers | 396/603 |
| 5,664,255 | A | 9/1997 | Wen | 396/627 |
| 5,667,944 | A | 9/1997 | Reem et al. | 430/359 |
| 5,678,116 | A | 10/1997 | Sugimoto et al. | 396/611 |
| 5,691,118 | A | 11/1997 | Haye | 430/357 |
| 5,695,914 | A | 12/1997 | Simon et al. | 430/379 |
| 5,698,382 | A | 12/1997 | Nakahanada et al. | 430/418 |
| 5,726,773 | A | 3/1998 | Mehlo et al. | 358/474 |
| 5,739,897 | A | 4/1998 | Frick et al. | 355/40 |
| 5,771,107 | A | 6/1998 | Fujimoto et al. | 358/464 |
| 5,790,277 | A | 8/1998 | Edgar | 358/487 |
| 5,835,795 | A | 11/1998 | Craig et al. | 396/6 |
| 5,835,811 | A | 11/1998 | Tsumura | 396/598 |
| 5,870,172 | A | 2/1999 | Blume | 355/27 |
| 5,880,819 | A | 3/1999 | Tanaka et al. | 355/75 |
| 5,892,595 | A | 4/1999 | Yamakawa et al. | 358/530 |
| 5,930,388 | A | 7/1999 | Murakami et al. | 382/167 |
| 5,959,720 | A | 9/1999 | Kwon et al. | 355/38 |
| 5,963,662 | A | 10/1999 | Vachtsevanos et al. | 382/150 |
| 5,966,465 | A | 10/1999 | Keith et al. | 382/232 |
| 5,979,011 | A | 11/1999 | Miyawaki et al. | 15/308 |
| 5,982,936 | A | 11/1999 | Tucker et al. | 382/233 |
| 5,982,937 | A | 11/1999 | Accad | 382/239 |
| 5,982,941 | A | 11/1999 | Loveridge et al. | 382/260 |
| 5,982,951 | A | 11/1999 | Katayama et al. | 382/284 |
| 5,988,896 | A | 11/1999 | Edgar | 396/604 |
| 5,991,444 | A | 11/1999 | Burt et al. | 382/232 |
| 5,998,109 | A | 12/1999 | Hirabayashi | 430/434 |
| 6,000,284 | A | 12/1999 | Shin et al. | 73/150 |
| 6,005,987 | A | 12/1999 | Nakamura et al. | 382/294 |
| 6,065,824 | A | 5/2000 | Bullock et al. | 347/19 |
| 6,069,714 | A | 5/2000 | Edgar | 358/487 |
| 6,088,084 | A | 7/2000 | Nishio | 355/75 |
| 6,089,687 | A | 7/2000 | Helterline | 347/7 |
| 6,101,273 | A | 8/2000 | Matama | 382/169 |
| 6,102,508 | A | 8/2000 | Cowger | 347/7 |
| 6,137,965 | A | 10/2000 | Burgeios et al. | 396/626 |
| 6,200,738 | B1 | 3/2001 | Takano et al. | 430/362 |

FOREIGN PATENT DOCUMENTS

| | | | | |
|---|---|---|---|---|
| EP | 0 422 220 A1 | 3/1989 | | A61B/6/03 |
| EP | 0 482 790 B1 | 9/1991 | | H04N/1/40 |
| EP | 0 525 886 A3 | 7/1992 | | G03D/5/00 |
| EP | 0 580 293 A1 | 6/1993 | | H04N/1/04 |
| EP | 0 580 293 A1 | 1/1994 | | H04N/1/04 |
| EP | 0 601 364 A1 | 6/1994 | | H04N/1/387 |
| EP | 0 669 753 A2 | 2/1995 | | H04N/1/407 |
| EP | 0 768 571 A2 | 4/1997 | | G03D/13/00 |
| EP | 0 794 454 A2 | 9/1997 | | G03B/27/73 |
| EP | 0 806 861 A1 | 11/1997 | | H04N/1/00 |

| | | | | |
|---|---|---|---|---|
| EP | 0 878 777 A2 | 11/1998 | ............. | G06T/5/40 |
| EP | 0 930 498 A2 | 7/1999 | .......... | G01N/21/88 |
| WO | WO 90/01240 | 2/1990 | ............ | H04N/1/40 |
| WO | WO 91/09493 | 6/1991 | .......... | H04N/5/217 |
| WO | WO 97/25652 | 7/1997 | ............ | G03D/5/00 |
| WO | WO 98/19216 | 5/1998 | ............ | G03C/5/29 |
| WO | WO 98/25399 | 6/1998 | ............ | H04N/1/38 |
| WO | WO 98/25399 A1 | 6/1998 | ............ | H04N/1/38 |
| WO | WO 98/31142 | 7/1998 | .......... | H04N/5/253 |
| WO | WO 98/34157 A2 | 8/1998 | | |
| WO | WO 98/34157 | 8/1998 | | |
| WO | WO 98/34397 | 8/1998 | | |
| WO | WO 99/43148 | 8/1999 | ............ | H04N/1/00 |
| WO | WO 99/43149 A1 | 8/1999 | ............ | H04N/1/00 |
| WO | WO 01/01197 | 1/2001 | ............ | G03D/5/00 |
| WO | WO 01/13174 A1 | 2/2001 | ............ | G03D/5/06 |
| WO | WO 01/45042 A1 | 6/2001 | ............. | G06T/5/00 |
| WO | WO 01/50192 A1 | 7/2001 | ........... | G03C/7/407 |
| WO | WO 01/50193 A1 | 7/2001 | ........... | G03C/7/407 |
| WO | WO 01/50194 A1 | 7/2001 | ........... | G03C/7/407 |
| WO | WO 01/50197 A1 | 7/2001 | ............ | G03C/7/42 |
| WO | WO 01/52556 A2 | 7/2001 | ............ | H04N/9/11 |

OTHER PUBLICATIONS

"Adaptive–neighborhood filtering of images corrupted by signal–dependent noise", R. Rangayyan, et al., Applied Optics, vol. 37, No. 20, pp. 4477–4487, Jul. 10, 1998.

"Grayscale Characteristics", The Nature of Color Images, Photographic Negatives, pp. 163–168.

"Parallel Production of Oligonucleotide Arrays Using Membranes and Reagent Jet Printing", D. Stimpson, et al., Research Reports, BioTechniques, vol. 25, No. 5, pp. 886–890, 1998.

"Low–Cost Display Assembly and Interconnect Using Ink–Jet Printing Technology", D. Hayes, et al., Display Works '99, MicroFab Technologies, Inc., pp. 1–4, 1999.

"Ink–Jet Based Fluid Microdispensing in Biochemical Applications", D. Wallace, MicroFab Technologies, Inc., Laboratory Automation News, vol. 1, No. 5, pp. 3, 6–9, Nov., 1996.

"Photorealistic Ink–Jet Printing Through Dynamic Spot Size Control", D. Wallace, et al., Journal of Imaging Science and Technology, vol. 40, No. 5, pp. 390–395, Sep./Oct. 1996.

"MicroJet Printing of Solder and Polymers for Multi–Chip Modules and Chip–Scale Package", D. Hayes, et al., Micro-Fab Technologies, Inc. (6 pages).

"A Method of Characteristics Model of a Drop–on–Demand Ink–Jet Device Using an Integral Method Drop Formation Model", D. Wallace, MicroFab Technologies, Inc., The American Society of Mechanical Engineers, Winter Annual Meeting, pp. 1–9, Dec. 10–15, 1989.

"Digital Imaging Equipment White Papers", Putting Damaged Film on ICE, www.nikonusa.com/reference/whitepapers/imaging, Nikon Corporation, Nov. 28, 2000.

* cited by examiner

METHOD AND SYSTEM FOR ESTIMATING SENSOR DARK CURRENT DRIFT AND SENSOR/ILLUMINATION NON-UNIFORMITIES

CROSS REFERENCE TO RELATED APPLICATIONS

This application claims benefit under 35 U.S.C. § 119(e) of U.S. Provisional Application Serial No. 60/173780, entitled Method and System for Estimating Sensor and Illumination Non-Uniformities, which was filed on Dec. 30, 1999 and U.S. Provisional Application Serial No. 60/174074, entitled Method and System for Estimating Sensor Dark Current Drift which was filed on Dec. 30,1999.

This application is related to the following co-pending applications all filed on Dec. 30, 1999: Serial No.60/173,781, entitled Pulsed Illumination Signal Modulation Control and Adjustment; Serial No. 60/173,787, entitled Digital Film Processing Method and System; and Serial No. 60/174,073, entitled Digital Film Processing Feature Location Method and System.

TECHNICAL FIELD OF THE INVENTION

This invention relates generally to electronic image processing and more particularly to a method and system for estimating sensor dark current drift, sensor non-uniformities, and illumination non-uniformities.

BACKGROUND OF THE INVENTION

During the scanning of photographic images from film, various factors may affect the quality of the resulting digital image. For example, systems used to derive digital images from film may suffer from both sensor and illumination non-uniformities, each of which may adversely affect the signal integrity of the images. Image quality may also depend, in part, on the characteristics of the film. Where digital image data is obtained from developing film, the characteristics of the developing chemical applied to the film may also affect image quality.

For example, processing images from film typically includes capturing digital data from the film with a sensor as the film is illuminated with a light source. Because the illumination levels captured by the sensor represent the image data, any sensor or illumination non-uniformities introduce undesirable errors into the data measurements. Unfortunately, sensor and illumination characteristics typically vary individually and can drift over time due to factors such as heating and/or transient responses in the devices when they are activated and deactivated. Where the film is scanned while being developed, variances in film and chemical developer characteristics often arise due to changes that take place during the development process. Signal levels captured by the sensors may also vary due to factors such as aging of the sensors or light sources.

Some systems include a calibration process using an external reference, such as a piece of film, in an attempt to correct some of these non-uniformities. The external reference is typically chosen to approximate the characteristics of the film before it is developed, and may be imaged periodically to recalibrate and correct for any non-uniformities throughout the development process. However, such external references may not accurately reflect the characteristics of film and/or developer chemicals while or after the film develops. They may also not reflect sensor or illumination characteristics that change during the development process.

SUMMARY OF THE INVENTION

From the foregoing, it may be appreciated that a need has arisen for providing a method and system for estimating sensor dark current drift, and for estimating sensor and illumination non-uniformities. The present invention substantially reduces or eliminates disadvantages and problems of existing systems.

One aspect of the present invention is a system for estimating sensor and illumination non-uniformities. The system comprises a first light source and a first sensor operable to capture light reflected from a first side of film illuminated by the light source while the film has a developer chemical applied thereto and processing circuitry coupled to the first sensor. The processing circuitry is operable to capture a first plurality of readings from the sensor responsive to light reflected from an unexposed region of film to determine a first set of non-uniformity data and adjust image data obtained from the film in response to the first set of non-uniformity data. In a further embodiment, the processing circuitry is further operable to dim the first light source for at least a portion of the time that the sensor is being used to sense the unexposed region of the film. The processing circuitry may also capture a second plurality of readings from the sensor while the first light source is dimmed to determine a second set of non-uniformity data and adjust image data obtained from the film in response to the second set of non-uniformity data.

Another aspect of the present invention is a system for estimating sensor dark current drift. The system comprises a first light source and a first sensor operable to capture light reflected from a first side of film illuminated by the light source while the film has a developer chemical applied thereto and processing circuitry coupled to the first sensor. The processing circuitry is operable to dim the light source for at least a portion of the time that the sensor is being used to sense a region of the film and to capture a first plurality of readings from the first sensor while the first light source is dimmed to determine a first set of non-uniformity data. The processing circuitry is also operable to adjust image data obtained from the film in response to the first set of non-uniformity data. The invention provides several important advantages. Various embodiments of the invention may have none, some, or all of these advantages. The invention may effectively utilize one or more unexposed regions of film while the film is developing. These regions may provide a window of opportunity to measure data that may be used to make corrections and/or adjustments to initial estimates of sensor, illumination, film, and/or developing chemical non-uniformities. The invention also allows correction and/or adjustment for non-uniformities without utilization of an external absolute reference. The invention may also utilize additional sensor views to capture data through various incident angles of light. These advantages may improve the accuracy of image data.

The invention may also use one or more unexposed regions to match the white level to one or more sensors each associated with a film development time. White level adjustment allows better use of the dynamic range of the sensor, resulting in a more accurate digital representation of the image.

The invention may also substantially reduce errors from variations in dark current levels that vary faster than the total processing time of a roll of film. For example, the invention may sample dark current levels during one or more unexposed regions while the film is being developed. Alternatively or in addition, the invention may also accommodate sampling of dark current levels within a sampling time for a latent image. The invention may also compensate for drift or other variations in sensor or illumination source characteristics between image capture sampling times. The invention may also adjust the captured image data to compensate for such variations. For example, sensor and illumination non-uniformities in the image data may be normalized and various gains for the image data may be adjusted using the measured data.

In addition, transient responses of devices can be reduced, as can the time for devices to reach a proper operating point. The invention may also generate an alert that illumination and sensor devices should be replaced. The invention may also prevent saturation of sensors in varying film, developer, and illumination conditions.

Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

The preferred embodiment of the present invention and its advantages are best understood by referring to FIGS. 1–11 of the drawings, like numerals being used for like and corresponding parts of the various drawings. Opportunities may be created to detect and/or adjust for sensor and/or illumination variations due to temperature fluctuations and/or other non-uniformities during digital film processing. The accuracy of captured image data may be desirably improved by compensating for these variations over time. This information may also be used to set a nominal level for white and/or a dark reference level to a sensor associated with one or more development times so that dynamic range of a digital film processing system may be more accurately matched to an image dynamic range. After providing initial estimates for parameters such as system and image dynamic range and sensor and illumination spatial non-uniformities, those parameters that are likely to drift rapidly enough to affect the quality of the image data may be monitored and updated. Image data may be adjusted in response to these parameters and/or updates after some or all of the data is captured. This information may also be used to normalize sensor and illumination non-uniformities and/or remove or reduce small or high frequency non-uniformities which may be due to factors other than the sensors and illuminators within the digital film processing system. Image data may be adjusted for these variations as, or after, image data is captured, or a combination thereof. In addition, these adjustments may also accommodate variations in the elevation and density of developing chemicals applied to the film as the film develops.

Figure 1:
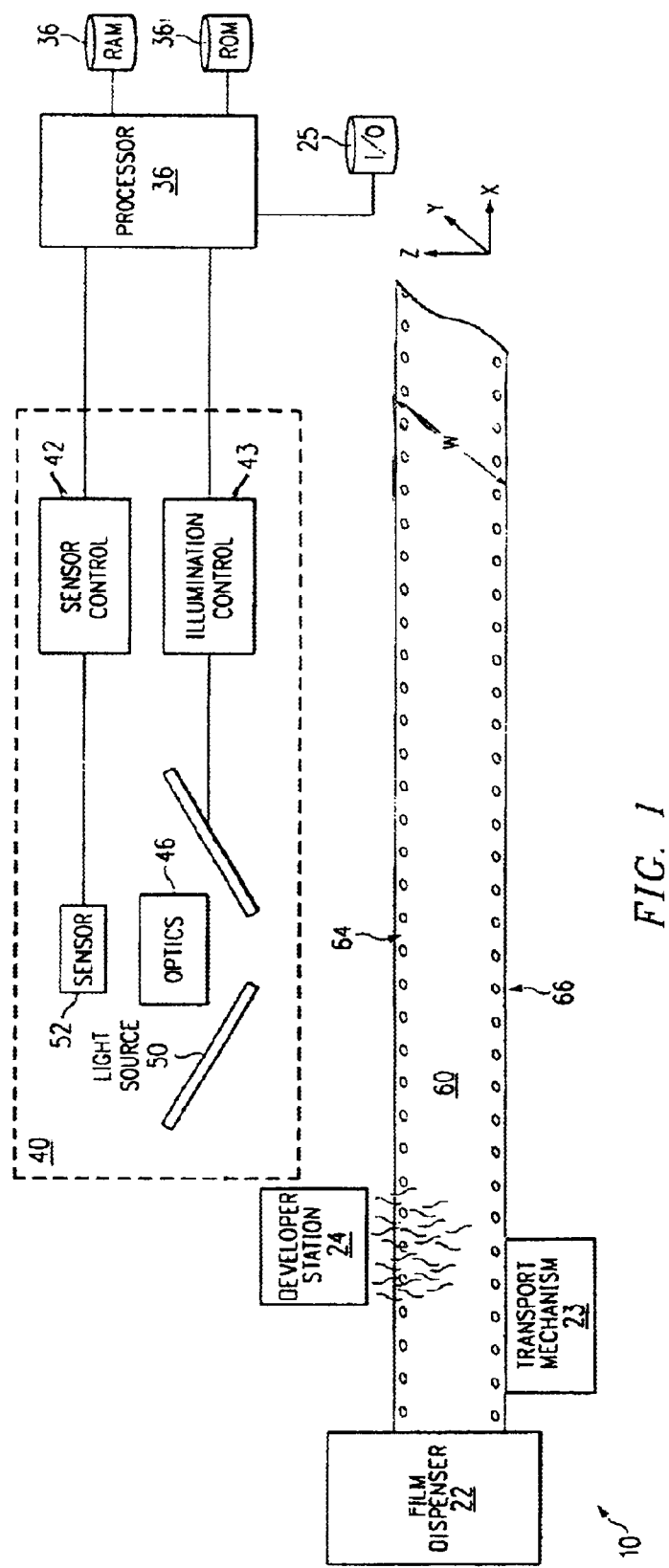
FIG. 1 illustrates an example of a digital film processing system that may be used in accordance with the invention.

FIG. 1 illustrates an example of a digital film processing system 10 that comprises an embodiment of the present invention. Digital film processing system 10 comprises a film dispenser 22, at least one transport mechanism 23, a developer station 24, a processor 36 and at least one input/output device 25, and at least one sensor station 40. Digital film processing system 10 is operable to capture and/or adjust data captured from a film 60 that is disposed proximate to and/or may move at a scan rate relative to sensor station 40. Digital film processing system 10 may desirably improve the accuracy of captured image data by compensating for fluctuations in a variety of parameters over time.

It may be illustrative to utilize a coordinate system to describe digital film processing system 10. For example, sensor station 40 may be disposed in a z direction proximate to, and may be moved at a scan rate relative to, a film 60 operable to store latent image data, such as film. Film 60 may be disposed, for example, in an x–y plane and have a width W in the y direction. By way of example and not by limitation, film 60 may be disposed in a generally vertical orientation, and/or may not be disposed within any single plane, but rather move through a plurality of orientations as sensor station 40 captures image data therefrom. As another example, film 60 may be disposed in a Mobius strip configuration so that sensor station 40 may capture image data from both portions 64 and 66. Sensor station 40 may also be disposed proximate to and oriented in various angles relative to film 60.

At least one sensor station 40 is operable to obtain image data from film 60, even while the film may have developing chemicals applied thereto. In other words, the film may be developing, or may be completely developed. Developer station 24 may be used to apply a thin layer of a developing chemical to film 60. By way of example and not by limitation, developer station 24 may be a slot coater or vibrating dispenser that sprays or otherwise applies the developing chemical to film 60. Transport mechanism 23 may be used to move film 60 at a desired scan rate relative to sensor station 40. Film dispenser 22 may be used to retain film 60 and to guide the film onto transport mechanism 23.

Sensor station 40 may be used to capture image data from film 60 and transfer the image data to an input/output device 25 such as a storage medium. Sensor station 40 comprises optics 46, light source 50, sensor 52, sensor control 42, and illumination control 43. Sensor 52 operates in concert with light source 50 and optics 46 to capture or obtain image data from a film 60.

Any suitable light source 50 and compatible sensor 52 such as those typically used in image processing applications involving photographic images may be used to capture image data for this aspect of sensor station 40. That is, sensor 52 may be any detector whose quantum efficiency, or responsivity, is compatible with a spectrum utilized by light source 50. For example, where light source 50 comprises mostly infrared or near-infrared energy, or energy outside the visible spectrum, sensor 52 is responsively operational to such wavelengths. Such an embodiment may be advantageous when digital film processing system 10 is used to capture image data from developing film because, for example, unexposed film is typically very reflective when illuminated with infrared energy. Such an advantage may facilitate location of unexposed regions of the film during which updating of estimates may be performed. Other combinations of light source and sensors may also be used. Other examples may include, but are not limited to, a light source comprising a single column point source coupled to a scan mirror that may be operated in conjunction with a sensor comprising a point detector coupled to the scan mirror.

In some applications, sensor 52 may comprise a plurality of charge-coupled devices (CCDs), photo diodes, or CMOS sensors. For example, sensor 52 may comprise a digital camera comprising a two-dimensional array of CCDs operable to capture data from a two-dimensional field of view in film 60. Sensor 52 may also comprise a generally linear one-dimensional array, where the array comprises a plurality of detectors such as CCDs. Sensor 52 may also comprise a generally linear array of 4,096 (or any other number) detectors that may be, for example, staggered or linearly aligned within the array. The generally linear array may be operable to capture a data or image column over a generally linear field of view that spans width W (in the y direction) of film 60, or a portion thereof.

Each detector within sensor 52 typically varies in thickness of coating, photo-emissive characteristics, optics, etc., and thus typically varies in responsivity to a given amount of illumination. The responsivity of each detector also varies due to noise, age, and temperature. Such variation in responsivity to illumination within each sensor typically results in spatial non-uniformities in the image data. For example, where sensor 52 comprises a generally linear CCD array, variations in the efficiency of each detector in converting photons to electrons results in variations in illumination levels measured by each detector, regardless of variations in the film 60 and/or content therein. One example of these spatial non-uniformities is discussed in conjunction with FIG. 3.

A system signal-to-noise ratio may be measured by a combination of sensor responsivity and illumination characteristics of each sensor station. This signal-to-noise ratio may be improved by selecting sensor 52 for its sensitivity to intensity and wavelength illumination. Further improvements to the accuracy of captured data, and thus to image quality, may also be obtained by matching captured electron levels in sensor 52 to a full dynamic range for each latent image within film 60. For example, the capacity of wells for each detector, that is, the number of photons it may convert to electrons affects the range of discrete digital levels measurable by each detector, regardless of data content within film 60. Wells within sensor 52 may be desirably sized to be sufficiently large to accommodate desired image signal to noise ratios. In addition, digital film processing system 10 may adjust integration time for sensor 52 and/or adjust the illumination power of light source 50 in order to maximize usage of the capacity of each detector well within sensor 52.

In one embodiment of the invention, light source 50 may be arranged in a wave guide. Each wave guide may comprise a plurality of illuminators, such as light emitting diodes (LEDs). Light may travel through wave guide 50 be reflected by film 60 through optics 46 to sensor 52. Any suitable optics 46 for use with light source 50 and sensor 52 may be used to produce desired optical effects in the image captured by sensor 52. For example, optics 46 may be used to focus, magnify or enlarge data in film 60 to a desired image resolution for an application, such as 12 $\mu$m per pixel. Optics 46 and light source 50 may be manually or automatically controlled by, for example, processor 36.

Processor 36 may be used for image adjustment in accordance with the present invention. Processor 36 may also control the operation of sensor station 40 by using sensor control 42 and/or illumination control 43. Alternatively or in addition, processor 36 may control sensor station 40 by, for example, executing software that may be stored in an input/output device 25 such as a storage medium. Although a single input/output device 25 has been illustrated for simplicity, input/output device 25 may comprise multiple storage media as well as comprising storage media of different types. Moreover, although illustrated as separate units, processor 36 may perform some, none, or all of the logic functions described as being performed within illumination control 43 and/or sensor control 42.

Specifically, processor 36 may be used to execute applications comprising image adjustment software. Image data adjustment may be performed using special purpose digital circuitry contained either in processor 36, or in a separate device. Such dedicated digital circuitry may include, for example, application-specific integrated circuitry (ASIC), state machines, fuzzy logic, etc. Processor 36 may also comprise a portion of a computer adapted to execute any of the well-known MS-DOS, PC-DOS, OS2, UNIX, MAC-OS and Windows operating systems or other operating systems, including nonconventional operating systems. Processor 36 may comprise random access memory (RAM) 36a and read only memory (ROM) 36b, and may be coupled to one or more input/output devices 25. These devices may include, but are not limited to, printers, disk drives, displays and a communications link. Disk drives may include a variety of types of storage media such as, for example, floppy disk drives, hard disk drives, CD ROM drives, or magnetic tape drives.

Input/output device 25 comprising a communication link may be connected to a computer network, a telephone line, an antenna, a gateway, or any other type of communication link. Image data captured from other than digital film processing system 10 may also be adjusted in accordance with the invention. For example, processor 36 may be coupled to an external network that may be used to obtain image data, such as a scanner or camera system. Captured image data may then be provided to processor 36 from a computer network over the communication link.

The present invention includes programs that may be stored in RAM 36a, ROM 36b, or input/output device 25 such as one or more disk drives, and may be executed by processor 36. In this embodiment, image data adjustment may be performed by software stored and executed by processor 36 with the results stored in an input/output device 25 comprising any suitable storage medium. Image data may be processed as it is obtained, after all data has been captured, or a combination thereof.

Illumination control 43 may be used to control the amount of optical energy given off by light source 50, both in time and in amplitude. For example, it may be desirable to adjust the output optical energy from light source 50 if sensor 52 is saturating, or if illumination levels are otherwise determined to be too high or too low. Illumination control 43 may also include additional circuitry used to interface the logic with light source 50.

Sensor control 42 may be used for data transfer and/or processing and to control activation and deactivation of sensor 50. For example, sensor control 42 may convert an analog signal to a digital pixel value, or transfer pixel data stored in sensor 52 where sensor 52 has an internal memory. In some applications, sensor 52 may also comprise logic, such as a programmable processor, that may adjust or process pixel data as desired, before the pixel data is transferred into a memory or storage medium. Such a processor may perform the functions of sensor control 42. In addition, sensor control 42 may also include a bias control to improve system dynamic range. For example, sensors may retain residual charge that decreases the amount of usable sensor capacity. Sensor control 42 may desirably increase the system dynamic range by applying a bias to sensor 52 to reduce the effect of this residual scene content on newly captured image data. Sensor control 42 may comprise software, hardware, or a combination thereof.

Sensor control 42 may also be used to control activation and deactivation of sensor 52, independently of or in conjunction with light source 50. For example, sensor 52 may comprise a mechanical or electronic shutter mechanism for controlling a dwell or integration time in which the sensor may convert a number of photons received into electrons. When light source 50 is activated, sensor 52 integrates over an interval of time signals reflected from film 60.

Digital film processing system 10 may obtain data from many kinds of images, such as color photographic images (either negative print or transparency), black and white images (either negative print or transparency and including black and white images derived from photographic film with multiple layers), other monochromatic images, x-rays, or any other type of image stored on film 60. Digital film processing system 10 may capture data from any tangible film 60 that may both reflect back and pass through illumination from a light source. One example of film 60 is discussed in conjunction with FIG. 1A.

Figure 1A:
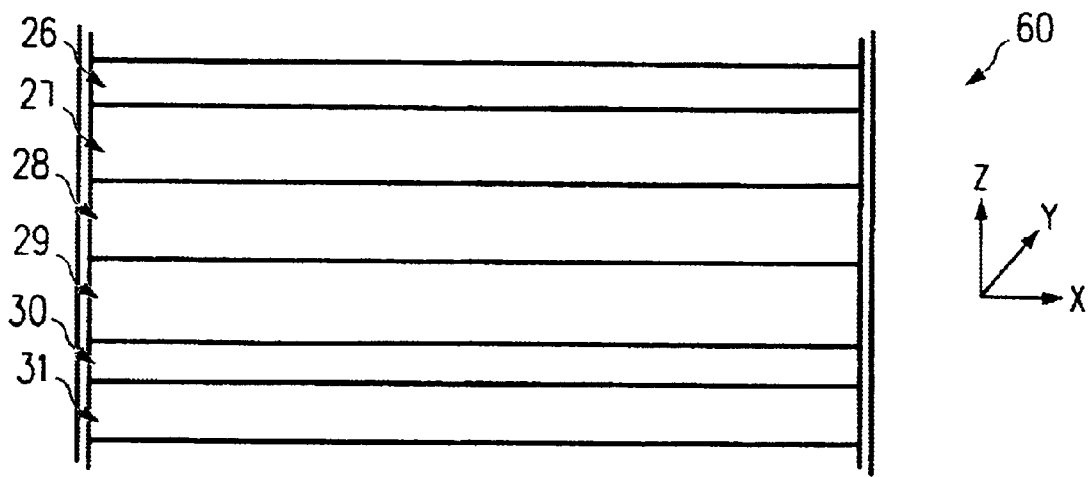
FIG. 1A illustrates an example of a cross section of film from which image data may be captured.

FIG. 1A illustrates an example of a cross-section of film from which image data may be captured. Color film 60 typically comprises three color emulsion layers—e.g., a blue layer 27, a green layer 28 and a red layer 29—that are stacked on an antihalation layer 30. These four layers are typically stacked on a transparent base substrate layer 31. Each of these layers and their density affect the incident angle of light transmitted through the film and thus the illumination levels measured by sensor 52. In some applications, a developing chemical layer 26 may be applied to film 60.

Film types vary with respect to the density of the antihalation layer, layer configuration, and thickness of the base layer. The density of film may also vary with respect to image content therein. For example, photographic film contains grains held on a substrate, such as silver-halide, as part of its physical makeup. These grains are a function of the latent image on the film, as well as the type and format of the film, with faster-speed and smaller-format film exhibiting more graininess.

Developing chemical layer 26 may vary in thickness in the z direction between different points on the film, and may also affect the apparent density of the film. During a film development process, grains within the film that were exposed to the most light are the first to develop, and other grains develop as the development process continues. Those areas in which the most grains develop for a given layer will have the greatest density and lowest resultant pixel values. In addition, as film develops, it increases in density as silver is formed from compounds within the film, thus permitting latent images to be obtained by sensor 42.

Figure 2:
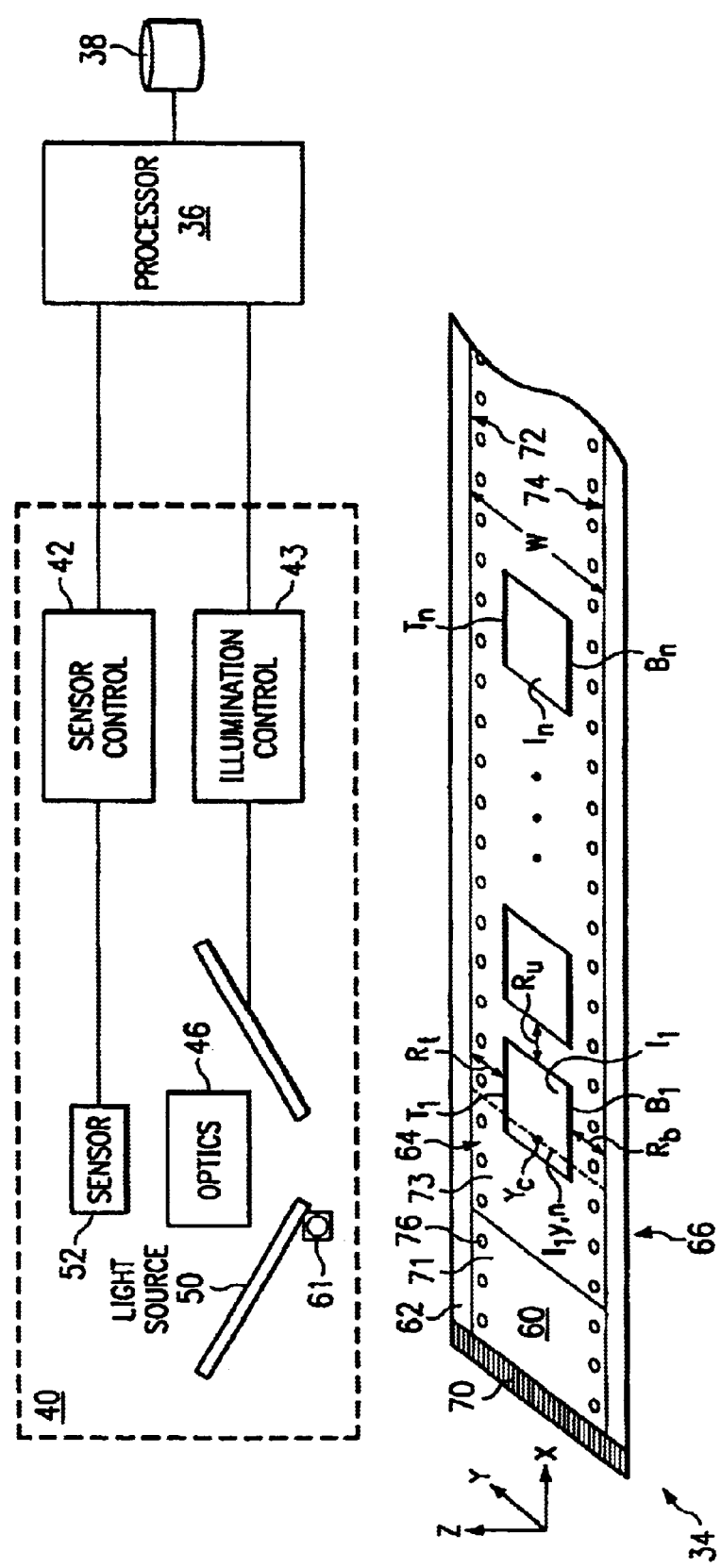
FIG. 2 illustrates an example of an image capture engine that comprises an embodiment of the present invention.

Sensor 52 is operable to measure light intensity within a spatial location of an image in film 60, even while film 60 is developing, or still has developing chemical applied thereto. These measurements may be obtained from silver formed from compounds within film 60, or the combination of silver and dyes rather than from dyes within each of layers 27–29 after the developing chemical has been removed. Each intensity value associated with the intensity of light at that spatial location in the original image in film 60 corresponds to one of a series of pixels within an image as captured and/or stored by image capture engine 34 (FIG. 2). The intensity refers generally to a pixel's brightness. For example, a white pixel has greater intensity values than a gray or black pixel. Thus, for pixels that comprise eight bits of resolution, a black pixel typically has an intensity value of close to zero, whereas a white pixel has an intensity value of close to 255. The range of light intensities within an image on film may be referred to as a dynamic range of the image.

FIG. 2 illustrates an example of an image capture engine 34 that comprises an embodiment of the present invention. Image capture engine 34 may be a portion of digital film processing system 10 and comprises processor 36, storage medium 38 and sensor station 40. Image capture engine 34 may also capture data from film 60, including a fixed reference location 70 and/or a leader 73. To illustrate this aspect of the invention, sensor 52 may comprise a generally linear array operable to capture a data or image column over a generally linear field of view that spans width W (in the y direction) of film 60, or a portion thereof. For example, FIG. 2 illustrates a column $I_{1(y,n)}$ that represents data that may be obtained from film 60 from one column in the y direction through image $I_1$ at column x=n.

Film 60 is illustrated with a width W in the y direction measured between a top edge 72 and a bottom edge 74. Film 60 may comprise a single image frame $I_1$, or a plurality of image frames $I_1$–$I_n$ disposed along the film in the x direction. Each image frame $I_1$–$I_n$ may be the same or a different size. For example, image frame $I_1$ may be an image represented by a×b pixels, where a and b are any integer. That is, image $I_1$ includes a plurality of a pixels or columns in the x direction, and b pixels or rows in the y direction. For example, each image frame $I_1$–$I_n$ may include 1024×1024 pixels, where a=b=1024.

A plurality of image frames $I_1$–$I_n$ is illustrated to discuss one aspect of the invention. In commercial films 60, each of these image frames $I_1$–$I_n$ may be separated by an unexposed region $R_u$. Film 60 may also comprise an unexposed region $R_t$ between a top extent $T_1$–$T_n$ of each image frame $I_1$–$I_n$ and top edge 72, and an unexposed region $R_b$ between a bottom extent $B_1$–$B_n$ of each image frame $I_1$–$I_n$ and bottom edge 74. In some films 60, unexposed regions $R_t$ and/or $R_b$ may also include one or more sprocket holes 76.

In operation, sensor station 40 obtains image data from film 60 and transfers the image data to a storage medium such as storage medium 38. Image capture engine 34 may create opportunities for monitoring and adjusting system dynamic range. For example, film 60 may comprise an area of unexposed film—the leader 73—which precedes a plurality of image frames $I_1$–$I_n$, in addition to an unexposed region or gutter $R_u$ between each image frame $I_1$–$I_n$. Image capture engine 34 may also use some or all of these unexposed regions in the film to provide initial estimates for film characteristics, non-uniformities, and/or drift rates.

For example, because each image comprises variable content, image capture engine 34 may desirably monitor and/or adjust system dynamic range for expected data within film 60 before capturing image data for each image. To improve the quality of resultant images, image capture engine 34 may desirably maximize the dynamic range of the image by mapping intensity values of each location to all usable pixel values (for eight-bit data, there are 256). Thus, image capture engine 34 desirably identifies the highest and lowest pixel values to be expected at the time of image data capture. For example, image capture engine 34 may utilize one or more of these regions of unexposed film, which comprise a relatively uniform region of the highest light intensities, to determine white levels. White levels as used in this specification may be defined as the highest pixel or signal value expected to be measured by sensor 52. Image capture engine 34 may also determine dark levels for each detector within sensor 52. Dark levels as used in this specification may be defined as the lowest pixel or signal value expected to be measured by sensor 52. The use of white and dark levels as used in this specification is not meant to impart any meaning to the content of image data. For example, white and dark levels within a film negative would have the opposite meanings for a positive image print.

Image capture engine 34 may also use some or all of these unexposed regions to update these initial estimates, and then use the estimates to adjust the image data. For example, data captured by sensor 52 to obtain the white and dark levels described above may also be used to determine dark current drifts and sensor and/or illumination non-uniformities described in conjunction with FIG. 3 for sensor 52.

Alternatively or in addition, image capture engine 34 may utilize additional time within an imaging window for the purpose of monitoring and/or adjusting various parameters. One example of an imaging window that may be used by image capture engine 34 is discussed in conjunction with FIG. 5. Image capture engine 34 may monitor and/or adjust for sensor and/or illumination non-uniformities and other characteristics that typically drift over time and/or due to changes in temperature.

Image capture engine 34 may also adjust image data after it has been captured to correct for these non-uniformities that may have been present while the image was captured. Image capture engine 34 may compensate for fluctuations in one or more of these parameters in any combination as desired. By performing one or more of these adjustments, image capture engine 34 may improve system dynamic range and/or signal to noise ratio and/or improve the quality of the resultant digital images.

Figure 2A:
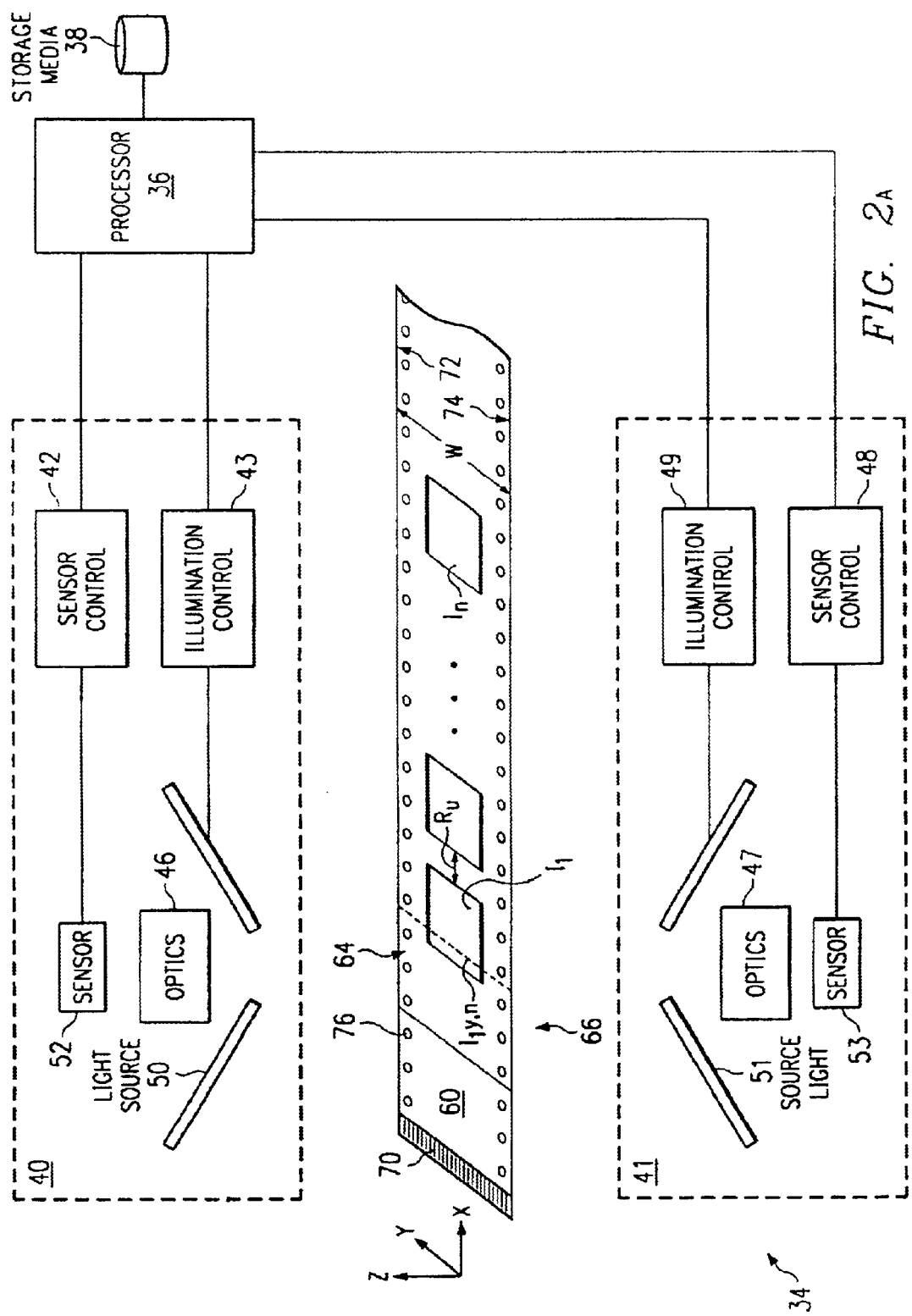
FIG. 2A illustrates another example of an image capture engine that comprises another embodiment of the present invention.

FIG. 2A illustrates another example of an image capture engine that comprises an embodiment of the present invention. Image capture engine 34 may also be a portion of digital film processing system 10 and comprises processor 36, storage medium 38 and sensor stations 40 and 41. Sensor stations 40 and 41 may be used to capture image data from film 60 and may be similarly configured, operated and/or controlled. For example, similar to sensor station 40 as discussed in conjunction with FIG. 1, sensor station 41 may be disposed in a z direction proximate to, and may be moved at a scan rate relative to, film 60. Film 60 may also move through a plurality of orientations as both sensor stations 40 and 41 capture image data therefrom. Sensor stations 40 and 41 may also be disposed proximate to and oriented in various angles relative to film 60.

Sensor station 41 comprises optics 47, light source 51, and sensor 53, and may also comprise its own sensor and illumination control 48 and 49. Alternatively, sensor station 41 may share sensor and illumination controls 42 and 43 with sensor station 40. In this embodiment, sensor station 40 may be located proximate to the top surface 64 of film 60, and sensor station 41 may be located proximate to bottom surface 66 of film 60. Sensors 52 and 53 operate in concert with light sources 50 and 51 and optics 46 and 47 to capture or obtain image data from film 60. Light sources 50 and 51 may utilize the same or different frequencies.

Sensor station 40 and sensor station 41 measure illumination levels through various incident angles of light reflected from and/or passed through film 60 to generate a resultant image. For example, sensor 52 may be used to capture light from light source 50 reflected from film 60 and/or light from light source 51 illuminated through film 60. Similarly, sensor 53 may be used to capture light from light source 51 reflected from film 60 and/or light from light source 50 illuminated through film 60. Each combination of a sensor and light source provides a sensor view. Image capture engine 34 may later adjust and combine the image data captured from one or more views by sensor stations 40 and/or 41 into various representations of one or more single images.

Processor 36 may control the operation of sensor stations 40 and 41 by using sensor controls 42 and 48 and/or illumination control 43 and 49. Alternatively or in addition, processor 36 may control sensor stations 40 and/or 41 by, for example, executing software that may be stored in storage medium 38. Also alternatively or in addition, processor 36 may comprise two individual processors. Each of these processors may control a respective sensor station.

Similar to illumination control 43 as discussed in conjunction with FIG. 1, illumination control 49 may be used to control the amount of optical energy given off by light source 51, both in time and in amplitude. Sensor controls 42 and 48 may be used to control activation and deactivation of sensors 52 and 53 respectively, independently of or in conjunction with light sources 50 and 51. Sensors 52 and 53 may integrate over a different intervals of time signals reflected from and transmitted through film 60 from light sources 50 and 51. Each sensor 52 and 53 may integrate over a unique interval of time that may vary, depending on parameters such as dynamic range or a desired imaging window time. Image capture engine 34 may thus control a combination of illuminated power and sensor integration time as desired.

Figure 2B:
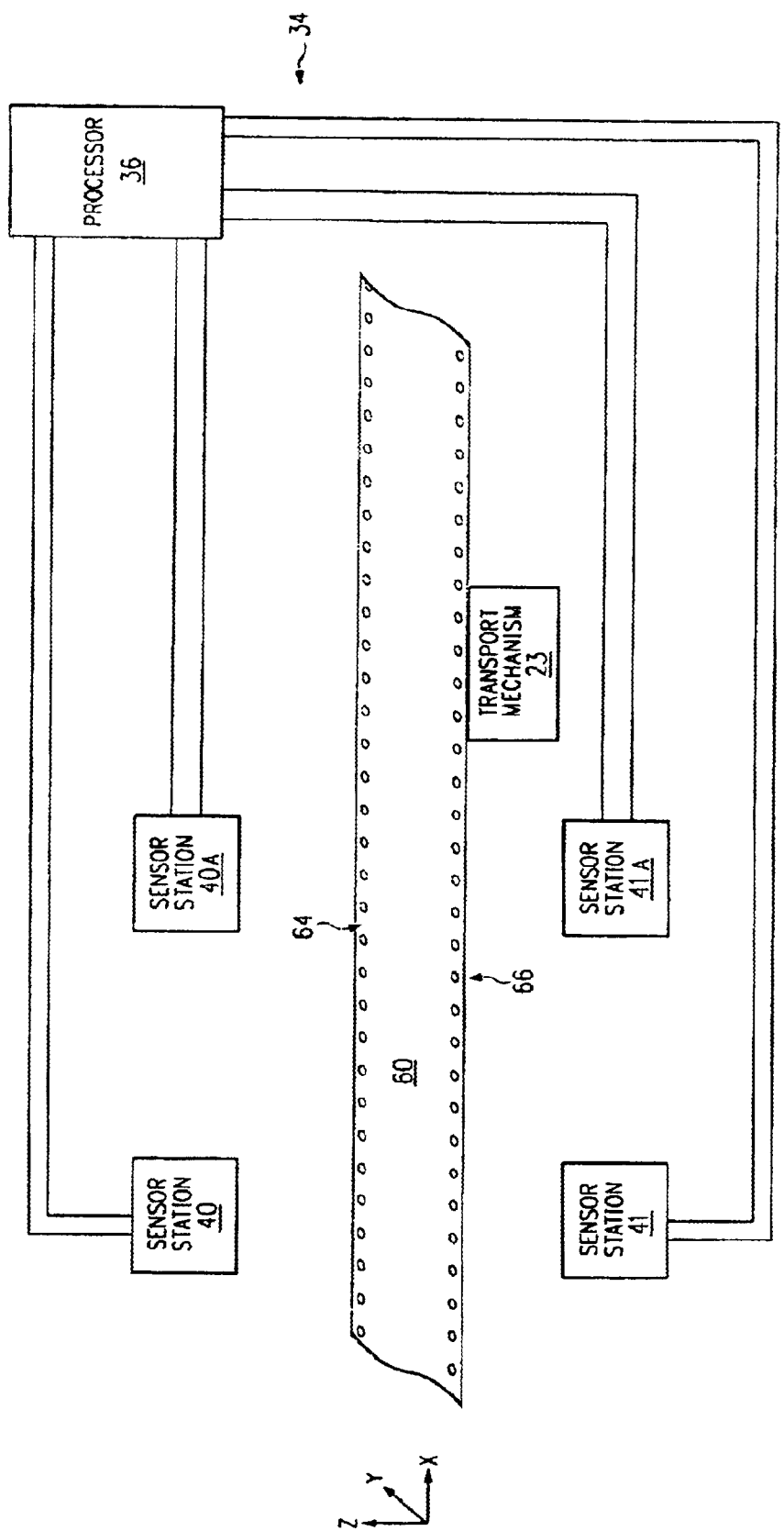
FIG. 2B illustrates another example of an image capture engine that comprises another embodiment of the present invention.

FIG. 2B illustrates another example of an image capture engine that comprises an embodiment of the present invention. In this embodiment, image capture engine 34 may also be a portion of digital film processing system 10 and comprises additional sensor stations 40a and 41a to monitor the reaction of developing film at one of a plurality of development times for the film. These additional sensor stations may provide additional information with respect to variances in film characteristics as film 60 develops. Any number of additional sensor stations 40a and 41a may be used within the scope of the invention.

In some applications, sensor stations 40a and/or 41a maybe disposed proximate to and at various intervals along the x direction of top portion 64 and bottom portion 66. Film 60 may move relative to these sensor stations at one or more scan rates where, for example, more than one transport mechanism 23 may be used. Each sensor station may be controlled with a common processor 36, or may be controlled with its own processor (not explicitly shown). Image capture engine 34 may later adjust and combine the image data captured from the plurality of sensor stations 40 and/or 41 into various representations of one or more single images. As will be discussed further in conjunction with FIGS. 4, and 6 through 10, image capture engine 34 may also utilize information provided by these other additional sensor stations to verify locations of unexposed regions of film.

Figure 3:
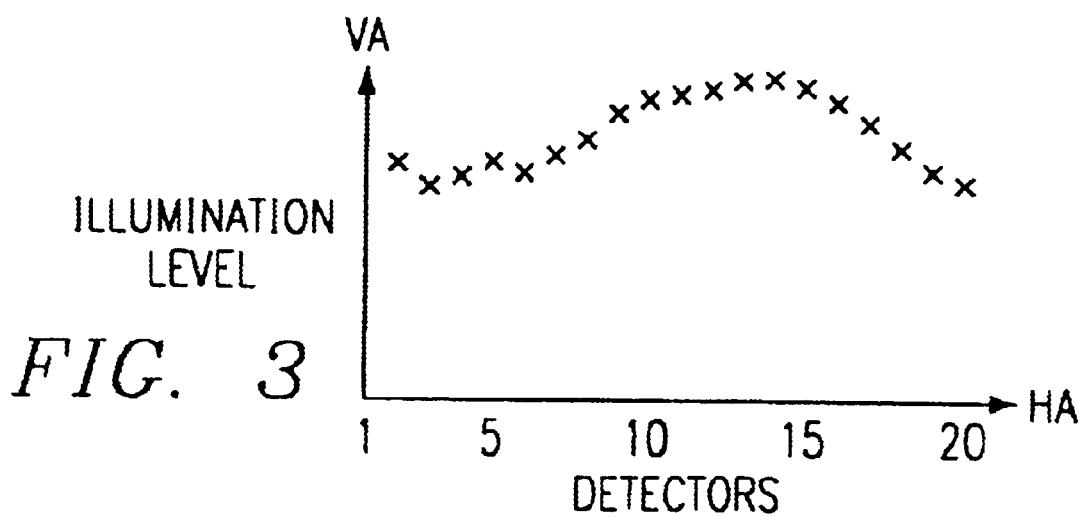
FIG. 3 graphically illustrates an example of non-uniformities in measured illumination that may be estimated in accordance with the present invention.

FIG. 3 graphically illustrates one example of non-uniformities in measured illumination that may be estimated in accordance with the present invention. These non-uniformities may be caused by some combination of variance in the characteristics of sensor 52, illumination from light sources 50 and/or 51, and/or developer applied to film 60. FIG. 3 illustrates by way of example along the vertical axis VA relative illumination levels that may be measured by a plurality of twenty detectors within a generally linear array sensor 52 along the horizontal axis HA. These illumination levels may be representative of non-uniformities within a generally linear array sensor disposed in the y direction within image capture engine 34. Dark current levels may similarly vary for each detector within sensor 52, and may be measured by dimming light source 50 and capturing readings from each detector within sensor 52. Light source 50 may be dimmed to a degree sufficient to measure dark current levels for each detector, including total extinguishment.

These values represent typical variations in illumination levels for a relatively uniformly-valued image, such as an unexposed region of film 60, and may desirably provide estimates for non-uniformities at that time. Because some variations may be present regardless of the image in film 60, these non-uniformities introduce errors in the apparent content of the data captured. These non-uniformities may also reduce the dynamic range of image capture engine 34.

In addition to variances within each sensor, light source 50 may similarly introduce illumination non-uniformity in the y direction across film 60, regardless of the image therein. FIG. 3 illustrates one example of illumination non-uniformities that result in a generally crowned shape. In this example, illumination levels decline towards each edge of film 60 from a light source 50 that is generally disposed proximate to the center of film 60 in the y direction illustrated in FIGS. 2–2B.

Image capture engine 34 may compensate for these variations for each sensor. For example, image capture engine 34 may capture data to update, adjust and/or normalize gains for each detector within the sensor. This compensation may provide the same signal level conversion within each sensor for a data column, thereby desirably reducing the potential corruption of image data due to non-uniformity data. One method for updating estimates for sensor and/or illumination non-uniformities and adjusting the image data in response thereto is discussed in conjunction with FIG. 4.

Figure 4:
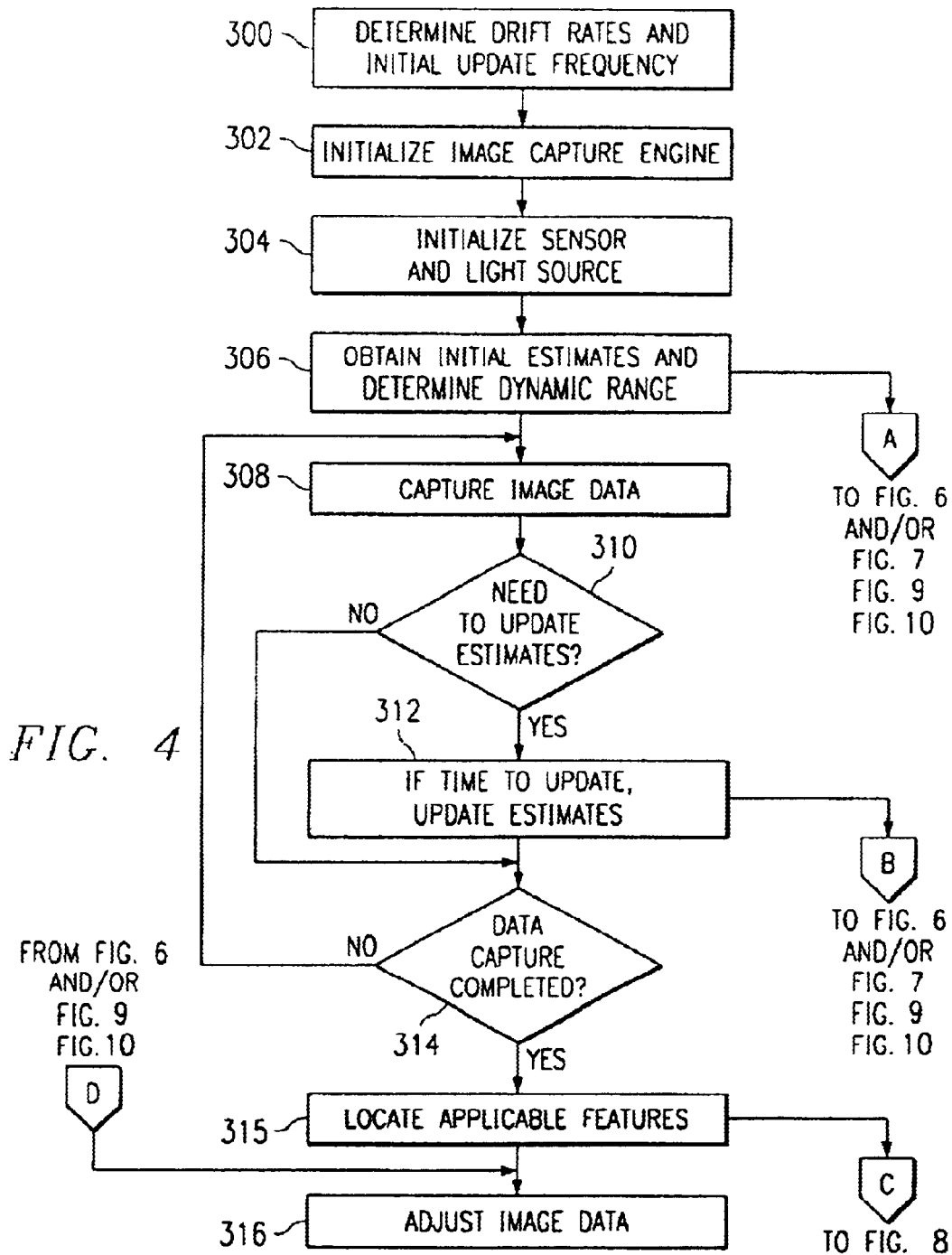
FIG. 4 illustrates an example of a method for capturing and adjusting image data in accordance with the present invention.

FIG. 4 illustrates an example of a method for capturing and adjusting image data in accordance with the present invention. While sensor station 40 is used to illustrate this aspect of the invention, the method discussed in conjunction with this FIG. 4 may be used with a plurality of sensor stations as illustrated in FIGS. 2–2B. Image capture engine 34 may selectively perform the method using one, some, or all of these sensor stations as desired.

The density of film may vary with respect to the type of film, in addition to image content therein. Photographic film contains grains held on a substrate, as part of its physical makeup. These grains are a function of the latent image on the film, as well as the type and format of the film, with faster-speed and smaller-format film exhibiting more graininess. Film types vary with respect to the density of an antihalation layer, layer configuration, and thickness of a transparent base substrate. For example, color film may comprise three color layers—e.g., blue, green and red—that are stacked on an antihalation layer. These four layers are typically stacked on the base layer. Each of these layers and their density affect the incident angle of light transmitted through the film and thus the illumination levels measured by sensor 52. In addition, image capture engine 34 may capture data from film while it still has a chemical developer applied to top portion 64. In other words, the film may be developing, or may be completely developed. As film develops, it increases in density as silver is formed from compounds within the film, thus permitting latent images to be obtained by image capture engine 34. Application of chemical developer may vary in thickness in the z direction between different points on the film, and may also affect the apparent density of the film.

Sensor 52 measures light intensity within a spatial location of an image in film 60. Each intensity value associated with the intensity of light at that spatial location in the original image in film 60 corresponds to one of a series of pixels within an image as captured and/or stored by image capture engine 34. During a film development process, grains within the film that were exposed to the most light are the first to develop, and other grains develop as the development process continues. Those areas in which the most grains develop for a given layer will have the greatest density and lowest resultant pixel values.

Referring to FIG. 2, image capture engine 34 may create opportunities for monitoring and adjusting system dynamic range. For example, film may comprise an area of exposed film 71 and/or unexposed film—the leader 73—which precedes a plurality of latent image regions or frames. Exposed region 71 may be, for example, an area of film 60 that has been exposed to bright light before a development process begins. Each image frame is also typically separated by an unexposed region or gutter $R_u$. Because each image comprises variable content, image capture engine 34 may desirably monitor and/or adjust system dynamic range for expected data within film 60 before capturing image data for each image. To improve the quality of resultant images, image capture engine 34 may desirably maximize the dynamic range of the image by mapping intensity values of each location to all usable pixel values (for eight-bit data, there are 256). Thus, image capture engine 34 desirably identifies the highest and lowest pixel values to be expected at the time of image data capture. For example, image capture engine 34 may utilize one or more regions of unexposed film, which comprises a relatively uniform region of the highest light intensities, to determine white levels. White levels as used in this specification may be defined as the highest pixel or signal value expected to be measured by sensor 52. Image capture engine 34 may also determine dark levels for each detector within sensor 52. Dark levels as used in this specification may be defined as the lowest pixel or signal value expected to be measured by sensor 52. The use of white and dark levels as used in this specification is not meant to impart any meaning to the content of image data. For example, white and dark levels within a film negative would have the opposite meanings for a positive image print.

Image capture engine 34 may also use some or all of these unexposed regions in the film to provide initial estimates for film characteristics, non-uniformities, and/or drift rates. Image capture engine 34 may also use some or all of these unexposed regions to update these initial estimates, and then use the estimates to adjust the image data. For example, data captured by sensor 52 to obtain the white and dark levels described above may also be used to determine dark current drifts and sensor and/or illumination non-uniformities described in conjunction with FIG. 3 for sensor 52. One method for locating these unexposed regions of film that may be developing or where developing chemicals are applied thereto is discussed in conjunction with FIG. 7.

Steps 300–316 comprise one embodiment of a method for obtaining and adjusting image data by image capture engine 34. Although steps 300–316 are illustrated as separate steps, various steps may be ordered in other logical or functional configurations, or may comprise single steps. It may be helpful to describe generally the method before describing each particular step. Image capture engine 34 may first optionally determine drift rates for sensor 52 and light source 50, and determine an initial update frequency in response to the drift rates. Image capture engine 34 may then be optionally initialized with a set of parameters suitable for adjusting data captured from film 60. Image capture engine 34 may then obtain initial estimates for sensor, film and illumination parameters, which may be updated during various steps within the method, and by using a variety of methods. Image capture engine 34 may monitor none, some or all of these parameters during image capture including during parameter measurement. Alternatively, or in addition, image capture engine 34 may adjust some of these parameters while it is capturing data from film 60, and/or may adjust image data after the data is captured.

Because both sensor 52 and light source 50 may drift in sensitivity over time due to factors such as temperature, image capture engine 34 may be designed to be operable using sensor 52 and light source 50 whose drift rates may be determined or estimated in optional step 300. For example, these drift rates may be empirically measured. Image capture engine 34 may utilize these drift rates before or during data capture to determine whether, or how often, to capture data to update estimates for these drifts. These updates may also desirably optimize the dynamic range for image capture engine 34 to the dynamic range for image data to be captured. Such an advantage may improve the signal integrity obtained by image capture engine 34 and thus the signal integrity of each processed image.

In response to the drift rates optionally measured in step 300, image capture engine 34 may also determine a frequency at which to update some or all of the parameters, if at all. This determination may be performed in step 300, or at any suitable place in the method. In the embodiment illustrated in this FIG. 4, this determination is performed in step 310. Image capture engine 34 may also dynamically vary the frequency for updating as desired. Image capture engine 34 may adjust image data using these updates after all data has been captured from film 60, or after each pixel, column, or two-dimensional region has been captured, as desired. These parameters may be used to adjust data captured from each image frame, as discussed in conjunction with step 316.

In step 302, each sensor station within image capture engine 34 may be optionally calibrated with some initial operating characteristics. Initializing sensor station 40 in image capture engine 34 may reduce variations in optical power over a period of time and/or due to temperature. For example, diodes within light source 50, and/or detectors within sensor 52, generally produce thermal transients that follow an impulse upon activation, or turn-on, and decline approximately exponentially over a short period of time. Therefore, it may be desirable to establish a stable operating point or level for light source 50 and sensor 52 to reduce fluctuations in output power and sensitivity. Establishing an input operating point for light source 50 in turn may stabilize the available signal strength that may be received by sensor 52, and may reduce the possibility that excess illumination may saturate sensor 52. In other words, this may reduce fluctuations in the dynamic range of image capture engine 34. In one embodiment of the invention, image capture engine 34 may be stabilized by waiting a short period of time, for example, sixty seconds, in order for light source 50 and sensor 52 to reach a nominal operating level. Such levels may be set automatically or manually.

In some applications, it may be desirable to avoid waiting for sensor station 40 to adjust to equilibrium. In such a case, light source 50 may be adjusted to compensate for illumination along a thermal transient output power decay curve while, for example, LED and/or CCD devices warm up.

It may also be desirable to monitor and/or control operating current or power levels for such devices to ensure that image capture engine 34 is properly functioning. Such an advantage also may reduce processing time and maintenance costs, etc. For example, because the efficiency of devices such as LEDs or CCDs typically decrease as the devices age, their efficiency in achieving a desired power output typically declines over a long period of time (approximately the life span of the device). As a result, image capture engine 34 should occasionally adjust (typically increase) an input operating current or power level in order for the device to actually output a desired level of power (such as illumination amplitude or pulse width).

One method for doing so includes image capture engine 34 capturing and storing within some non-volatile memory such as, e.g., storage medium 38 or ROM 36b, an operational level or operating point that is used to output the desired power level. Image capture engine 34 may store operating points as tables, variables, files, or in any other suitable arrangement. Image capture engine 34 may then access the non-volatile memory and use the operating points to activate the device at any time during the method. Saving and providing access to operating points as a device ages allows image capture engine 34 to adjust and change the operating points (and thus reach desired output power levels) as needed. Such an advantage may decrease thermal transients of, and initialization times for, the devices. Image capture engine 34 may also provide functionality to track a history of operating points for each device. This history may also be used to sound an alarm or send a message indicating that the device needs replacement. Image capture engine 34 may provide such functionality for each detector within sensor 52, LED within light source 50, and/or for sensor 52 and/or light source 50.

In step 304, image capture engine 34 initializes sensor 52 and light source 50. In this step, image capture engine 34 may optionally adjust and/or set sensor and illumination levels for a film type. For example, image capture engine 34 may adjust and/or set an integration time of sensor 52 and/or an illumination power of light source 50 for an expected density of the film type and expected signal strength. These adjustments may desirably prevent saturation of sensor 52 during capture of image data in image regions within film 60, because data within these image regions should fall within the dynamic range of the leader. In one embodiment of the invention, an initialization set point for such parameters may be automatically chosen if variation in film types is large. Such set points may be stored in, for example, tables, variables, files, or in any other suitable arrangement in RAM 36a, RAM 36b, and/or storage medium 38, or may be manually chosen. On the other hand, if variation between film types is small then some nominal set point may be chosen.

Alternatively or in addition, image capture engine 34 may in step 306 use leader 73 to obtain initial estimates and determine an initial dynamic range for sensor and illumination parameters. These estimates may be established by obtaining a plurality of readings within a region, such as a column, from leader 73, or obtaining substantially all data therefrom, whether or not a chemical developer has been applied. For example, leader 73 may be used to estimate the density of film 60, and to measure white levels to estimate a high level for the dynamic range thereof. Similarly, dark levels may also be obtained to estimate a low level for the dynamic range, by dimming one or more light sources.

Alternatively or in addition, leader 73 may be used as a film-based target to remove non-uniformities in the y direction, such as those discussed in conjunction with FIG. 3. To illustrate, light source 50 may be illuminated, and sensor 52 may capture a plurality of columns of readings of light reflected from the leader of film 60. Image capture engine 34 may then average these columns. Averaging several columns of data may desirably improve the estimate for spatial non-uniformities and the effective uniformity of film 60, because each detector is typically subject to random noise, and film 60 is typically not uniform. This averaged result may establish a white level estimate specific to film 60. Similarly, image capture engine 34 may dim light source 50, and capture a plurality of readings from sensor 52. Image capture engine 34 may average these readings to establish a dark level estimate for the dynamic range of film 60. Because each detector in sensor 52 may have a different gain, image capture engine 34 may later use these white and dark level estimates to normalize gains across subsequent columns of image data. These variations may be thus reduced or removed from the image data, as is further discussed below.

In step 308, image capture engine 34 begins capturing data from film 60, by illuminating film 60 using light source 50 and capturing data with sensor 52. As previously discussed, image capture engine 34 may capture two-dimensional image data from film 60 by utilizing a two-dimensional sensor 52, such as a staring array. Alternatively, a generally linear array sensor 52 may obtain a data or image column along the y direction of film 60 as illustrated in FIGS. 2–2B. Film 60 may be moved at a scan rate relative to sensor 52 in the x direction to obtain a two-dimensional plurality of columns for each latent image in film 60. In some applications, image capture engine 34 may identify expected regions of each data column as or after data is captured. For example, image capture engine 34 may generally break down a portion of a data column into at least two areas—an image region and an unexposed region. These areas generally correspond to an unexposed region $R_u$ and image $I_i$, as discussed in FIG. 2.

Image capture engine 34 may use an imaging window T during which sensor 52 may obtain image data from film 60 illuminated by light source 50. One example of an imaging window T is discussed in conjunction with FIG. 5, where image capture engine may utilize sensor stations 40 and 41 to capture data from film 60. The duration of such an imaging window may be a length of time sufficient to obtain a desired resolution, such as 12 μm per square pixel. For example, if a square pixel is desired, optics 46 and a generally linear sensor 52 may be suitably adjusted to obtain data in the y direction of 12 μm. Then, image capture engine 34 may adjust the scan rate to obtain the desired resolution of 12 μm in the x direction. At a next imaging window T, sensor 52 may capture a next column of data from film 60, and repeat this process until all image data from film 60 has been captured. Alternatively, a two-dimensional sensor 52 may be used to obtain image data for a two-dimensional region from film 60 by using a similar process.

In step 310, image capture engine 34 determines whether to monitor and/or update sensor and/or illumination parameters. Where sensor and illumination drift rates are slow relative to the total data capture time, image capture engine 34 may determine that no monitoring or updating need be performed. Image capture engine 34 may then proceed to step 314 without performing any updates, such as collecting data from any unexposed region of film 60.

Alternatively, where sensor and illumination drift rates are faster than the total data capture time, image capture engine 34 may determine when to update estimates, and perform the updating as desired, in step 312. This step may be omitted in some embodiments of the invention, or performed at other stages, such as before each image frame. The invention may include updating estimates to drift rates and non-uniformities and adjusting image data, and/or illumination levels. After updating estimates, if any, image capture engine proceeds to step 314 and back to step 308 to capture a next set of image data.

For example, where sensor and illumination drift rates may be fast relative to the total data capture time, but slow relative to a time that may be required to capture data from an image frame on film 60 (image frame time), image capture engine 34 may create opportunities to update estimates derived from the leader. For example, image capture engine 34 may utilize one or more unexposed regions between each image frame to update these estimates, as discussed in conjunction with FIGS. 6–8. This data may be used to update estimates for non-uniformities of each sensor station so that they may be used to update data captured for one or more successive image frames, as discussed in conjunction with step 316.

Alternatively or in addition, image capture engine 34 may add additional time to capture data to imaging window in which an image column is captured. For example, image capture engine 34 may dim each light source and gather several columns of dark level data that may be used to adjust for dark current drift correction of each sensor. One example for the capturing dark levels within an imaging window is discussed further conjunction with FIG. 5.

Also alternatively or in addition, image capture engine 34 may also monitor and adjust the system dynamic range to match the dynamic range of each image. For example, image capture engine 34 may, for example, adjust illumination power (such as pulse width and/or amplitude) and sensor integration time. Generally, sensor integration time may be combined, and traded off, with a level of illumination power to obtain an effective illumination time or illumination level that may be captured by a sensor. For example, an increased effective illumination time may be obtained by either increasing sensor integration time at a given illumination power, or increasing the power of illumination at a given sensor integration time. Effective illumination time may be similarly decreased by decreasing sensor integration time or decreasing illuminated power under similar conditions. Thus, in applications where it may be desirable to capture images within a short time period, higher illumination levels may in some cases be used with a shorter sensor integration time. Similarly, where a given illumination level may be desirable, two different sensors such as sensors 52 and 53 may utilize different integration times to capture varying amounts of illuminated power. This provides the advantage of allowing the full sensitivity of sensor stations to be used for each image while avoiding saturation of sensors 52 and 53, thus optimizing the dynamic range for each sensor. Such an advantage may also provide flexibility for image capture engine 34 to capture additional data from film 60 that may be used to provide correction or adjustments. One example method for adjusting effective illumination time and/or levels is discussed in conjunction with FIG. 10.

Where illuminator drift rates are fast relative to the image frame time, image capture engine 34 may also monitor and/or adjust illumination levels. For example, image capture engine 34 may utilize an external reference 62 as illustrated in FIG. 2 to capture data that may be used to estimate drifts between each region or column of image data. Image capture engine 34 may also optionally use the captured data to control sensor 52 and/or light source 50 before the next column or region of data is captured. One method for utilizing such an external reference 62 is illustrated and described in further conjunction with FIG. 10.

In step 314, image capture engine 34 optionally determines whether all image data from film 60 has been captured. For example, the invention also contemplates on-the-fly image data adjustment. That is, image capture engine 34 may adjust image data after some or all of the image data has been captured from film 60. In this example, if all image data has not been captured, image capture engine 34 returns to step 308 to continue the method. If so, image capture engine 34 proceeds to step 316 to adjust the captured image data.

Image capture engine 34 may perform adjustments in step 316 to image data captured using estimates and updates thereto obtained during steps 304-312. Image capture engine 34 may adjust the dynamic range for the captured image data, and apply a variety of gain adjustments. For example, image capture engine 34 may normalize the image data across detectors within sensor 52 to provide a uniform gain within sensor 52, as discussed in conjunction with FIG. 3. Normalizing the gains of captured image data may also avoid overflow in calculations. Alternatively or in addition, image capture engine 34 may uniformly determine a gain using data captured by reference detectors to apply to image data captured by sensor 52. Image capture engine 34 then applies adjustments to the data using estimates and any updates thereto to reduce the effects of non-uniformities in the captured image data. Because the method may adjust image data with updates captured at a plurality of times, the integrity of the image data may be improved notwithstanding any changes in film density as film 60 develops.

Image capture engine 34 may perform adjustments as frequently as desired, as discussed above. The image adjustment described herein may be performed on image data captured by image capture engine 34 or received by general purpose computer 10. Although one embodiment of an exemplary image capture engine 34 that may be used for image adjustment in connection with the invention has been illustrated, other image capture engines maybe used without departing from the scope of the invention.

Processing may be performed as desired, including, but not limited to, a pixel, array (such as a data column), or image frame basis. Processing may also be performed in parallel or pipelined. Any or all non-uniformities need not be completely removed during adjustment to fall within the scope of the invention. Accordingly, adjustment includes, but is not limited to, reduction of non-uniformities or errors, or other alterations of pixel data in the captured image. To illustrate this aspect of the invention, adjustment is performed on image data captured in data columns by a generally linear sensor that comprises a plurality of detectors.

Captured and/or adjusted image data, as well as data captured for estimates and updates, may be stored as pixel values representing the measured sensor illumination levels. These data may be stored in non-volatile memory such as storage medium 38 for subsequent processing, and/or stored in RAM 36a, RAM 36b, or in other storage media within image capture engine 34 for near-simultaneous processing.

For each update to estimates of white level data, image capture engine 34 desirably may first apply a gain factor to the white level data obtained in one or more unexposed regions of film 60. The gain factor may be used to insure that all pixels within white level data comprise larger pixel values than corresponding pixels in the image data to be adjusted. Such an advantage may prevent overflow in any normalization calculations. Image capture engine 34 may calculate the gain factor by first generating a histogram comprising a quantity of pixels counted for each pixel bin value for the white level data. The histogram assigns the actual maximum and minimum pixel values, and the remaining pixel values therebetween, into a series of bins.

Image capture engine 34 may then determine a desired set point by adding the quantity of pixels within a plurality of bins, beginning with the bin having the largest pixel value and working downward through bins with subsequently lower pixel values. Image capture engine 34 continues this process until the total quantity of pixels exceeds a certain percentage of the overall number of pixels, for example, 0.1%. Image capture engine 34 may then calculate the gain factor by taking the actual maximum pixel value and dividing by the pixel value of the lowest bin number. Each pixel of captured image data may be multiplied by the gain factor. In other words, the gain factor may be used to effectively move the histogram to the left, or lower the overall pixel value of the captured image data. This action may avoid overflow and thus calculation of incorrect pixel values in the normalized image that are typically present when image data and white levels are captured at different times with different or drifting illumination levels and/or sensor responsivity.

Then, to ensure that image data captured in the y direction is spatially uniform, image capture engine 34 may normalize estimates for sensor and/or illumination non-uniformities measured during one or more unexposed regions of film 60. First, image capture engine 34 may optionally average the captured data for each detector within the sensor for several data columns within the unexposed region. This step may be performed in this step 316, or in some applications in step 612, as discussed in FIG. 6. Averaging or an equivalent thereto may reduce or eliminate other high frequency defects that may be due to external factors.

Image capture engine 34 may then use one of many methods to normalize these estimates. For example, image capture engine 34 may determine a new gain level from the data captured from the unexposed region to achieve the effect of an approximately uniform instantaneous scan of film 60. This reduces or removes the corruption of image data from the effects of sensor and/or illumination non-uniformities. This new gain level may be calculated for white level measurements as well as dark level measurements obtained by method such as the ones described in FIGS. 5 and 6.

Image capture engine 34 may then apply this new gain level to each pixel of image data captured from one or more subsequent image frames. Alternatively, the new gain level may be represented as a gain factor. Depending on the gain factor used, adjustment may be performed by, for example, multiplying the gain factor by the captured image data. The desired pixel value may be a predetermined value, or an averaged value. For example, the desired pixel value may be an average of all of the detector values within a captured data column in the y-direction.

Image capture engine 34 may also optionally ensure that image data captured in the x direction is spatially uniform, by using one of many methods to normalize estimates for illumination non-uniformities that may be measured within an image frame. Image capture engine 34 may then determine an illumination gain factor, from this data captured to achieve the effect of an approximately uniform scan across an image frame, and/or the roll of film. This reduces or removes the effects of sensor and/or illumination non-uniformities from subsequent data captured within the image frame. This illumination gain factor may be calculated for illumination measurements by a method such as the one described in conjunction with FIG. 10. Adjustment may be performed here or in step 506, and on a column-by-column basis.

Where a plurality of sensor stations are used, image data captured by each sensor station may be normalized independently. Such independent processing may be desirable, for example, where image capture engine 34 may utilize different parameters for each sensor station such as light sources using various wavelengths, and/or sensors with varying integration times. When a plurality of sensor stations are used, each representation of an image captured by a sensor station may be recombined and/or undergo other processing to form a single representation of the image. Alternatively or in addition, image capture engine 34 may utilize data such as the location of a fixed reference point to predict the location of gutter regions and/or image frames using sensor stations 40 and/or 40a by measuring locations with regularly spaced sprocket holes 76. In addition, the location of unexposed regions may be used to perform image alignment where a plurality of sensor stations are used. By utilizing a plurality of locations for these feature data produced by these sensor stations, the image data may be adjusted to more accurately reflect the location of image frames.

Figure 5:
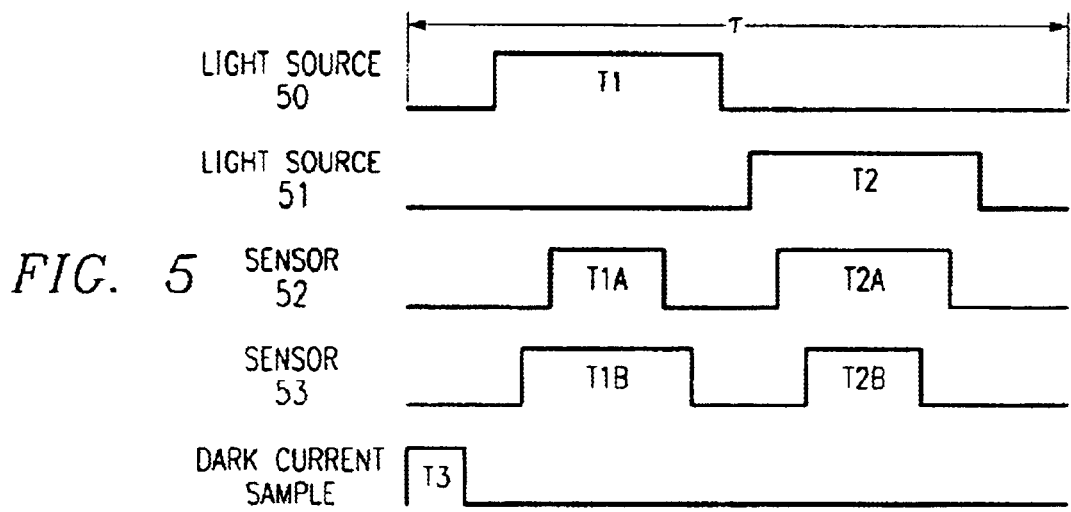
FIG. 5 graphically illustrates an example of an imaging window that may be used to capture data in accordance with the present invention.

FIG. 5 graphically illustrates an example of an imaging window T that may be used to capture data in accordance with the present invention. To illustrate this aspect of the invention, image capture engine 34 (FIG. 2A) may capture image data during imaging window T from film 60 by utilizing sensor stations 40 and 41. During imaging window T, a two-dimensional sensor 52 may be used to capture image data from a two-dimensional region of film 60, and a generally linear array sensor 52 may obtain a data or image column along the y direction of film 60. The first two waveforms illustrated in FIG. 5 represent activation periods for light sources 50 and 51, during which they typically emit a pulse of a desired amplitude level. Similarly, the third and fourth waveforms represent integration periods for sensors 52 and 53, during which time they are converting photons to electrons. The fifth and optional waveform represents a period in which a plurality of readings may be captured from sensors 52 and 53 in which estimates of any dark current drifts may optionally be updated.

In operation, image capture engine 34 illuminates light source 50 for a period of time T1. Sensor 52 may be activated and capture light reflected from film 60 for a period of time T1A. Approximately simultaneously, sensor 53 may also be activated and capture image data for a period of time T1B as light from light source 50 is directed through film 60. Light source 50 may then be dimmed at the end of T1, and light source 51 may be illuminated for a period of time T2. Sensor 53 may be activated and capture light reflected from film 60 for a period of time T2B and approximately simultaneously, sensor 52 may be activated and capture light illuminated through film 60 for a period of time T2A. Alternatively, where light sources 50 and 51 utilize different spectral wavelengths, both light sources may remain illuminated through periods T1 and T2 provided sensors 52 and 53 have two or more columns of detectors which are uniquely sensitive to the independent wavelengths. Period T1B is typically larger than period T1A, where sensor 53 may integrate light directed through film 60 for a longer period without saturating than may sensor 52 integrate light reflected from film 60. Similarly, period T2A is typically larger than period T2B.

In addition, image capture engine 34 may optionally dim both light sources 50 and 51 for a period of time T3 to capture a plurality of readings from sensors 52 and 53 so that estimates of any dark current drifts may be accurately updated. These estimates may be used as desired to adjust image data captured from one or more subsequent image columns or frames, as is discussed in conjunction with FIG. 4. Another example for updating these estimates is discussed in further detail in conjunction with FIG. 6.

Image capture engine 34 may utilize a variety of methods to determine the durations of imaging window T and periods T1, T1A, T1B, T2, T2A, and T2B. For example, image capture engine 34 may determine the duration of such an imaging window T to be a length of time sufficient to obtain a desired resolution at a desired scan rate, as previously discussed. Thus, imaging window T may decrease as scan rate or pixel resolution increases. Image capture engine 34 may also decrease imaging window T by, for example, increasing the illuminated levels of light sources 50 and 51. Image capture engine may increase illumination levels by, for example, increasing an amplitude of light sources 50 and 51, or by increasing the pulse width of light sources 50 and 51. Increased illumination levels may in some applications be used with decreased sensor integration time, subject to system dynamic range limitations. Image capture engine 34 may also optionally accommodate a sufficient period of time T3 to capture dark current levels for sensors 52 and 53, by one of two methods. Image capture engine 34 may enlarge imaging window T or may decrease one or more periods T1, T1A, T1B, T2, T2A, and/or T2B. Where one or more periods T1, T1A, T1B, T2, T2A, and/or T2B may be decreased, image capture engine 34 may increase the effective illumination power by, for example, increasing an amplitude of the pulses output by light sources 50 and 51.

Figure 6:
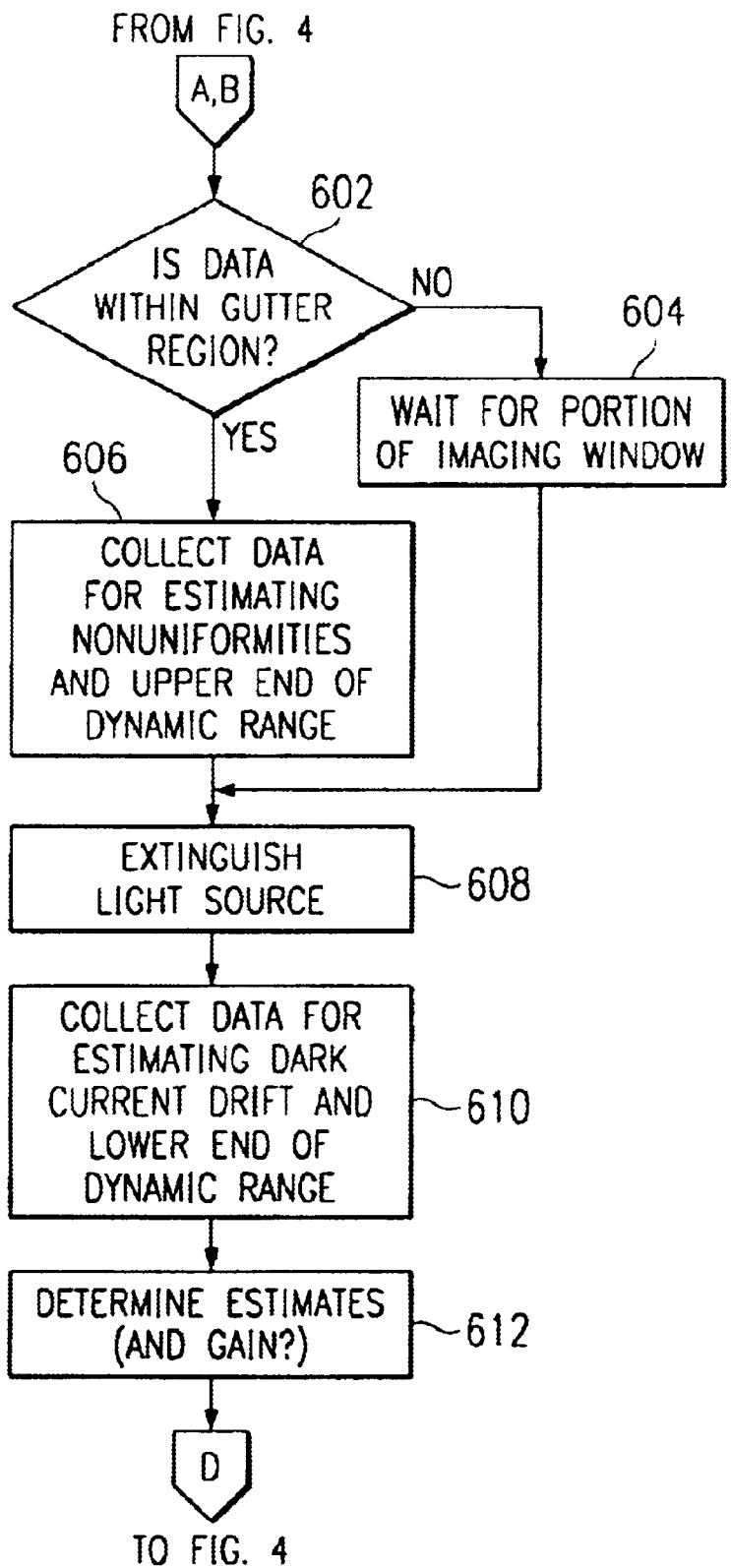
FIG. 6 illustrates an example of a method for providing estimates for sensor and illumination non-uniformities and white and dark levels for an image capture system in accordance with the present invention.

FIG. 6 illustrates an example of a method for providing estimates for sensor and illumination non-uniformities and white and dark levels for an image capture system in accordance with the present invention. The method may take advantage of one or more unexposed regions of film 60 to sample its graininess and to provide estimates for white and dark levels and/or sensor and illumination non-uniformities (along an instantaneous scan in the y direction for a generally linear sensor). Image capture engine 34 may also reduce or eliminate other high frequency defects that may be due to external factors by averaging data captured during this method. The method may also provide these estimates at a plurality of development times as film density increases. By capturing these estimates, image capture engine 34 may improve system dynamic range over time and thus improve the integrity of the captured image data. These estimates may be used to adjust image data as discussed in conjunction with step 316. While sensor station 40 is used to illustrate this aspect of the invention, the method discussed in conjunction with this FIG. 6 may be used with a plurality of sensor stations and/or views. Image capture engine 34 may selectively perform the method independently for some or all sensors and/or views as desired.

The method begins in step 602, where image capture engine 34 may optionally determine whether the data to be captured is in an unexposed region of film 60. If so, image capture engine 34 may begin collecting information to update estimates for sensor and/or illumination non-uniformities, white and/or dark levels, and/or sensor dark current drift. Capturing data during this region desirably does not interrupt the capture of data within an image frame. Image capture engine 34 may locate unexposed regions of film 60 while it is developing using a method such as the one discussed in conjunction with FIGS. 7 and 8.

Image capture engine 34 may otherwise optionally in step 604 utilize additional time during imaging window T to update sensor dark current drift estimates, as is discussed below and in conjunction with FIG. 5. For example, while in an image frame, image capture engine 34 may enlarge one or more imaging windows. Image capture engine 34 may measure dark levels within sensor 52 that may be used to not only update estimates for dark current drift, but also to system dynamic range. These estimates may be used to correct or adjust image data to be captured in the nearest latent image column or frame, as discussed in conjunction with step 316.

If image capture engine 34 determines that this data is in an unexposed region in step 602, then in step 606 image capture engine 34 may capture data to estimate and/or update a variety of parameters. For example, where light source 50 illuminates film 60 with infrared energy, each unexposed region of film 60 is typically very reflective. Thus, sensor 52 may measure white levels within one or more of these regions. These white levels may be used to provide dynamic range adjustment to the captured image data, as discussed in conjunction with step 316.

Alternatively or in addition, this region will typically also provide a relatively uniform region for measuring the sensor and/or illumination non-uniformities in the y-direction that may be adjusted from the image data. Thus, image capture engine 34 may utilize this region to update estimates for sensor responsivity to grains within the layers of film 60. In one embodiment of the invention, processor 36 may be used to capture a plurality of readings from sensor 52 from light reflected from film 60 by light source 50, and/or from light illuminated through film 60 by light source 51. In this example, these readings may be similar to the illumination levels illustrated and discussed in conjunction with FIG. 3. These readings may be used to provide non-uniformity data that may be used to later adjust the image data to remove or reduce non-uniformities within the layers of film 60, the developer, and/or the sensor stations.

Image capture engine 34 may also optionally dim light source 50 in step 608 for a time sufficient to capture a plurality of readings in step 610. These data may provide an accurate update for estimates of any dark current drifts within sensor 52 and/or dark current levels, and may be used to later adjust the image data.

In step 612, image capture engine 34 may determine estimates for sensor and/or illumination non-uniformities, and/or sensor dark current drift in response to the readings gathered from sensor 52 during steps 606–610. Because film 60 is only relatively uniform, it may be desirable to remove or reduce any variance therein. In addition, in some applications, small or high frequency residual non-uniformities that may be due to factors other than image capture engine 34 may also be desirably reduced or removed. The invention contemplates a variety of methods to reduce these effects. For example, a rate of capture and instantaneous field of view for detectors within a generally linear sensor 52 may be combined to generate multiple columns of data. These readings from each of these columns may be averaged to develop a high quality, low noise estimate of the non-uniformities within image capture engine 34. These readings may be averaged across a plurality of unexposed regions, as well as within a single data region, and may be averaged by pixel or by column. These averaged readings provide non-uniformity data that may be used to adjust image data. Such non-uniformity data may be used to compute the amount of gain required at each detector within each sensor to remove the sensor and/or illumination non-uniformities. This advantage provides an effective uniform gain across the y direction of film 60.

In other applications, a sensor comprising a two-dimensional array of detectors may also be used to capture a single image over a larger area of unexposed film. One such example may include the leader of film 60. In such an embodiment, film 60 and/or sensor 52 may be moved, in one or two dimensions. This movement may effectively blur any small or high frequency non-uniformities that may be due to factors other than sensor or illumination non-uniformities. This method may effectively average the readings obtained by the sensor to provide non-uniformity data.

Image capture engine 34 may utilize processor 36 to control transfer and/or storage of these readings and data into a non-volatile memory such as storage medium 38 for subsequent processing, and/or stored in RAM 36*a*, RAM 36*b* or in other storage media within image capture engine 34. The method then may utilize these estimates in adjusting image data in step 316.

In operation, image capture engine 34 may utilize an imaging window T1 similar to imaging window T described in conjunction with FIG. 5. That is, imaging window T1 may be sized to capture a number of readings from sensors 52 and/or 53 that are sufficient to yield a value such as an average that is representative of the plurality of columns. Image capture engine 34 may utilize a number of configurations during imaging window T1. For example, image capture engine 34 may illuminate light source 50 for a number of columns C1, while sensor 52 and sensor 53 capture image data over the number of columns C1. Similarly, light source 50 may then be dimmed at the end of C1, and light source 51 may be illuminated for a number of columns C2 while sensor 52 and sensor 53 capture image data over the number of columns C2. In addition, image capture engine 34 may dim both light sources 50 and 51 to capture a plurality of readings from sensors 52 and 53 for a number of columns C3 to obtain an average for estimates of any dark current drifts.

In some cases, such as where film 60 has developed sufficiently to provide an expected width for an unexposed region at a given scan rate and pixel resolution, imaging window T may be of a definite value, such as 150 columns of data. In this example, image capture engine 34 may divide imaging window T into three equivalent periods of 50 data columns each. That is, C1=C2=C3=50. On the other hand, it may be desirable in some applications to divide imaging window T into varying periods that provide flexibility in allocating time to performing each step in the method. For example, it may be desirable to obtain many more data columns for one estimate than another to ensure that the method returns a valid location. One example may include C1=C2=60, and C3=30. The invention also contemplates the use of a wide variety of values for periods with imaging window T.

Alternatively, the size of the unexposed region of film 60 may not be known, such as when film 60 has not been sufficiently developed. In these cases, image capture engine 34 may provide for smaller values for C1, C2, and C3. Image capture engine 34 may also adaptively change these values until all image data is captured, and/or from sensor station to sensor station. Imaging window T may also be divided into additional periods to include additional views.

Figure 7:
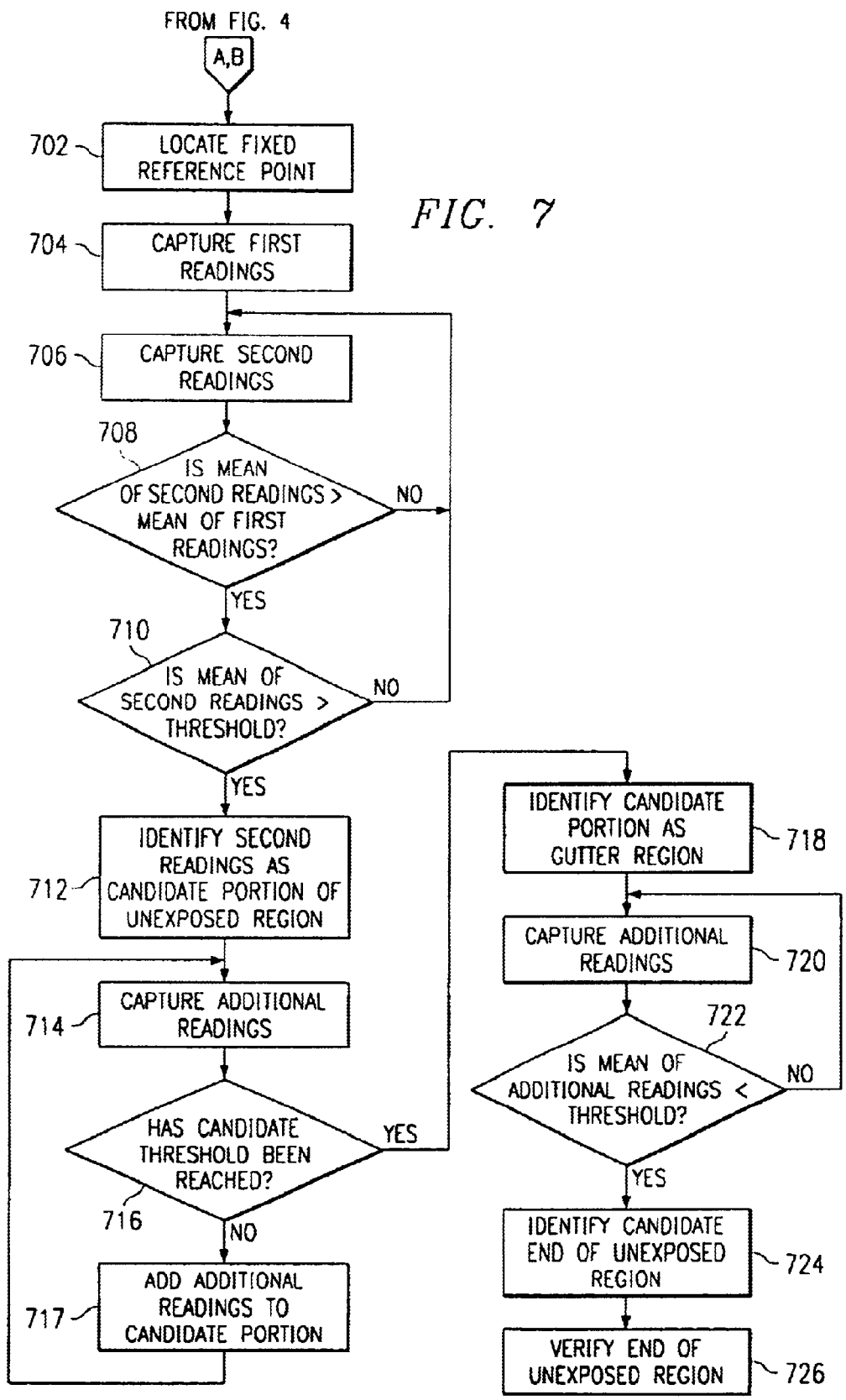
FIG. 7 illustrates an example of a method for locating an unexposed region of film while it is developing utilizing the teachings of the present invention.

FIG. 7 illustrates an example of a method for locating an unexposed region of film while the film is developing utilizing the teachings of the present invention. Image capture engine 34 may generally locate none, some, or all unexposed regions of film that usually occur between adjacent images. Image capture engine 34 may utilize several parameters, such as a fixed reference location, to detect these locations, in some cases, early within the development process. Generally, image capture engine 34 may seek an unexposed region, such as a leader or gutter of film 60, by capturing a plurality of sensor readings and comparing them to a threshold. When the threshold is exceeded, image capture engine 34 identifies a candidate gutter region. After image capture engine 34 identifies a candidate gutter region, image capture engine 34 then seeks the next latent image frame region, which signals the edge of the gutter region. The method may optionally utilize a variety of parameters and/or counters to establish expected widths of gutters and images, which may be used to detect subsequent gutter locations. These expected widths may also be used to adjust image data that may have been captured early in the development process of film 60. A generally linear array sensor 52, operable to capture a data column from film 60 as film 60 is moved at a scan rate relative to the sensor, is used to describe this aspect of the invention. As discussed previously, the invention also contemplates the use of two-dimensional sensors that move at a scan rate relative to film 60, and staring arrays. The method may be performed for one or more views, and/or one or more sensor stations.

The method begins at step 702, where image capture engine 34 may optionally locate a fixed reference point at step 702. The fixed reference point may comprise any suitable indicia that may be detected by image capture engine 34, such as tape 70 operable to absorb the wavelength of the light source. Thus, the location of the fixed reference point may be perceived both by a sensor capturing light reflected from, as well as a sensor capturing light illuminated through, film 60. Tape 70 may be, for example, infrared absorbing tape such as Lab Depot Opaque Tape 12–200, and may be disposed, affixed or coupled to either top portion 64 or bottom portion 66 of film 60 as illustrated in FIGS. 2–2B. The reference point may also comprise a physical edge of film 60. Other reference points may also include, but are not limited to, markings such as holes, notches or slits cut into or delineated on film 60. Because the fixed reference point virtually absorbs the wavelength of the light source, readings captured by a sensor from the fixed reference point typically measure zero, or near zero. These near-zero measurements may provide a strongly contrasting signal measurement to any region on film 60, especially near unexposed regions of film 60, where sensor readings typically comprise white levels.

Usually the signal values within an image area are significantly below those within a gutter region. Image capture engine 34 may begin capturing a plurality of readings from film 60 shortly after deposition of developer on the film. Values for a plurality of detector readings in a generally linear array may be held in a buffer or storage medium 38 for processing and comparison with subsequent data columns. In step 704, image capture engine 34 begins seeking a first gutter edge. For example, image capture engine 34 may capture a first column of data from film 60, and determine a representative value, such as a mean value, for the first data column. In step 706, image capture engine 34 then captures a next column of data from film 60 and determines a representative value, such as a mean, for the next data column. Image capture engine 34 then in step 708 compares the representative values and determines the greater of the two. Image capture engine 34 then identifies the column with the larger representative value as a candidate gutter portion. Image capture engine 34 may hold the next data column for comparison with successive data columns to be captured from film 60. If the representative value of the first data column is larger than that of the second data column, image capture engine 34 returns to step 706 to capture a new next data column.

If the representative value of the first data column is smaller than that of the second data column, image capture engine 34 then determines in step 710 whether the larger representative value exceeds a threshold. Typically, because signal values within a latent image frame region are significantly below those within a gutter region of film 60, the threshold may be set at a pixel or illumination level value that is reasonably high. For example, the threshold may be predetermined to be a level approximately equal to, for example, 90% of the white level value. The threshold may also be dynamically determined. For example, film becomes more dense as it develops, and image capture engine 34 may decrease the minimum threshold used to identify the latent image edge for a gutter as the illumination levels within image regions measurable by the sensors correspondingly decrease. In this case, image capture engine 34 may desirably adaptively change values for the threshold over time to accommodate variances in the development process.

If the larger representative value exceeds the threshold, image capture engine 34 identifies the next data column as a candidate portion of an unexposed region in step 712. If not, image capture engine 34 returns to step 706 to capture a new next column of data.

Image capture engine 34 then captures an additional column of data in step 714, and repeats the process of determining the greater of the two representative values of last two data columns read and whether the greater representative value exceeds the threshold. This process continues until a candidate threshold has been reached, at which point image capture engine 34 identifies the candidate portion as a gutter region in step 718. That is, enough comparisons have been made to identify a candidate gutter region. If the candidate threshold has not been reached, image capture engine 34 adds the data column with the larger representative value to the candidate gutter portion in step 717 and continues the process in step 714.

The number of comparisons desirable to determine the candidate threshold may vary where film 60 is developing. For example, the number of comparisons may be large where the film has not yet developed to generate sufficient contrast data between images and gutter regions. On the other hand, image capture engine 34 may be able to identify a gutter edge by fewer captured data columns as the film more fully develops in steps 712–716. Furthermore, image capture engine 34 may optionally also use adaptive methods to count the number of expected columns in each gutter and each image within the film. Such expected column numbers may be used as a template to verify each region, and in imaging window T as discussed in conjunction with FIG. 6.

Image capture engine 34 may use a variety of methods to determine a sufficient number of comparisons. For example, image capture engine 34 may also utilize an actual or assumed knowledge of the scan rate and image motion to calculate an expected number of columns in a gutter region as well as an expected number of columns in an image. Image capture engine 34 may also utilize one or more counters. These counters may include, but are not limited to, counters that track the number of data columns that have exceeded the threshold, track the number of data columns that have been captured, and the number of data columns that may be expected in the gutter region, and the number of data columns expected within an image frame.

For example, image capture engine 34 may choose to disable the gutter location feature and avoid performing any adjustments that might have been made to subsequently captured image data, if the expected count values are not properly achieved. Thus, when the number of columns to be expected for a gutter is known, the count of the number of columns exceeding the threshold can be compared. If the threshold is not exceeded before the count reaches the expected number, then the counter should be reset and the search begins anew. Then, image capture engine 34 may verify that the columns comprise a gutter location by counting the number of consecutive columns that exceed the threshold. Similarly, image capture engine 34 may use the counters to verify initial and final boundaries for an unexposed region of film 60, where the unexposed regions are typically regularly spaced and/or regularly sized. For example, commercial films 60 may typically comprise a gutter region 150 columns wide, where pixels generally comprise a resolution of 12 $\mu$m.

Because a gutter width is typically wider than one column, once image capture engine 34 has identified a candidate portion as a gutter region, image capture engine 34 next seeks and locates the trailing boundary of the gutter in steps 720–724. This trailing boundary typically abuts the first edge of the next latent image frame. Image capture engine 34 captures an additional data column in step 720, and determines whether a representative value of the data column exceeds the threshold in step 722. If the representative value of the data column does exceed the threshold, image capture engine 34 determines that the data column is still within the gutter region, and returns to step 720. Again, image capture engine 34 may optionally utilize a counter to track the number of data columns that have been determined to be within the gutter region, and exit the process as desired, when, for example, expected count values have not been properly achieved.

When the representative value of the data column falls below the threshold, image capture engine 34 then identifies the data column as a first column of a next image in step 724. Image capture engine 34 may also optionally identify the next-to-last data column as a candidate end of the unexposed region in step 724.

Image capture engine 34 may then verify the end of the unexposed region in step 726. For example, image capture engine 34 may compare a counter that has tracked the number of data columns that have been determined to be within the gutter region with a number of expected columns for a gutter. Alternatively or in addition, image capture engine 34 may initiate a counter to track the number of columns in the image, and begin the search for the next gutter edge. When image capture engine 34 identifies a new candidate portion of an unexposed region, image capture engine 34 may compare this counter to the expected width of the image to verify that a proper identification for the image has been made. Image capture engine 34 may also verify that the image is properly located between two actual gutter regions.

The invention contemplates the use of representative values such as arithmetic, geometric, or any other type of mean value, or order statistics, etc. In addition, the mean may be measured over one or more columns of data captured. Furthermore, image capture engine 34 may use a variety of statistical variants, such as standard deviations of the widths and/or the repetition pattern for prior gutter regions, to more effectively identify a next gutter region.

Image capture engine 34 may also utilize parameters such as the scan rate and the fixed reference point identified in optional step 702 to more effectively identify the location of one or more gutter regions within film 60. For example, image capture engine 34 may utilize the fixed reference point to form a template to predict when to expect and/or verify that a column of data is located within an image and/or a gutter region. Such a template may improve the robustness of the method by, for example, adaptively decreasing the number of columns necessary to identify a candidate gutter region.

Image capture engine 34 may monitor the location of the fixed reference point relative to a location where image data is captured from the film. For example, image capture engine 34 may determine an offset in pixels or in absolute distance from the fixed reference point to another point to determine the location on film 60 of a data column. For example, the fixed reference point may be used in conjunction with features such as the sprocket holes 76 discussed in FIG. 2. Because of their periodic nature, image capture engine 34 may utilize these values to predict the location of gutter regions using sensor stations 40 and/or 40*a*. In some applications, it may be desirable to measure this offset to a sprocket hole 76, because sprocket holes 76 are typically regularly spaced within commercial films 60. As a result, image frames are typically regularly sized with regard to sprocket holes. For example, commercial films 60 typically include image frames that are approximately eight sprocket holes wide. Although where each image frame begins with regard to the sprocket holes may depend on how a camera was loaded, an initial offset, such as three pixels, may be sufficient to determine an exact location of the image frames relative to each sprocket. Then, a relative spacing, in pixels or in absolute distance, may be measured from the nearest sprocket hole to a candidate gutter location.

Alternatively or in addition, the offset may be measured from the fixed reference point to a sensor station. For example, image capture engine 34 may comprise any number of sensor stations disposed at intervals in the x direction. For example, as illustrated in FIG. 2B, sensor stations 40 and 40a may each capture image data at various film development times. Moreover, the scan rate for each sensor station may also be vary slightly, due to factors such as variance in motor speeds that may move film 60. As a result, the distance measurable in pixels between sprocket holes may vary slightly from sensor station to sensor station. Image capture engine 34 may utilize parameters such as scan rate, resolution, and absolute distances between each sensor station 40 and 40a to appropriately calculate the offset.

In some applications, image capture engine 34 may also use the offset to retroactively identify gutter regions for other sensor stations. For example, image capture engine 34 may monitor development times for sensor stations 40 and 40a. Inage capture engine 34 may determine at sensor station 40a that development time is sufficient to delineate at least one gutter region and may determine a first gutter location utilizing sensor station 40a. Because the film may be moved relative to sensor station 40a at a different rate than to sensor station 40, image capture engine 34 may utilize the scan rates for sensor station 40a to determine location of the gutter location relative to the fixed reference point.

Image capture engine 34 may then utilize the fixed reference point to determine where the gutter location is relative to sensor station 40. Image capture engine 34 may utilize this approach to conclusively locate unexposed regions in film early in the chemical development process. Knowledge of these locations may be used to save memory and processing power for the regions of film that comprise useful information content, and to adjust image data that may have previously been captured by sensor stations 40 and/or 40a, as discussed in conjunction with FIG. 4.

Figure 8:
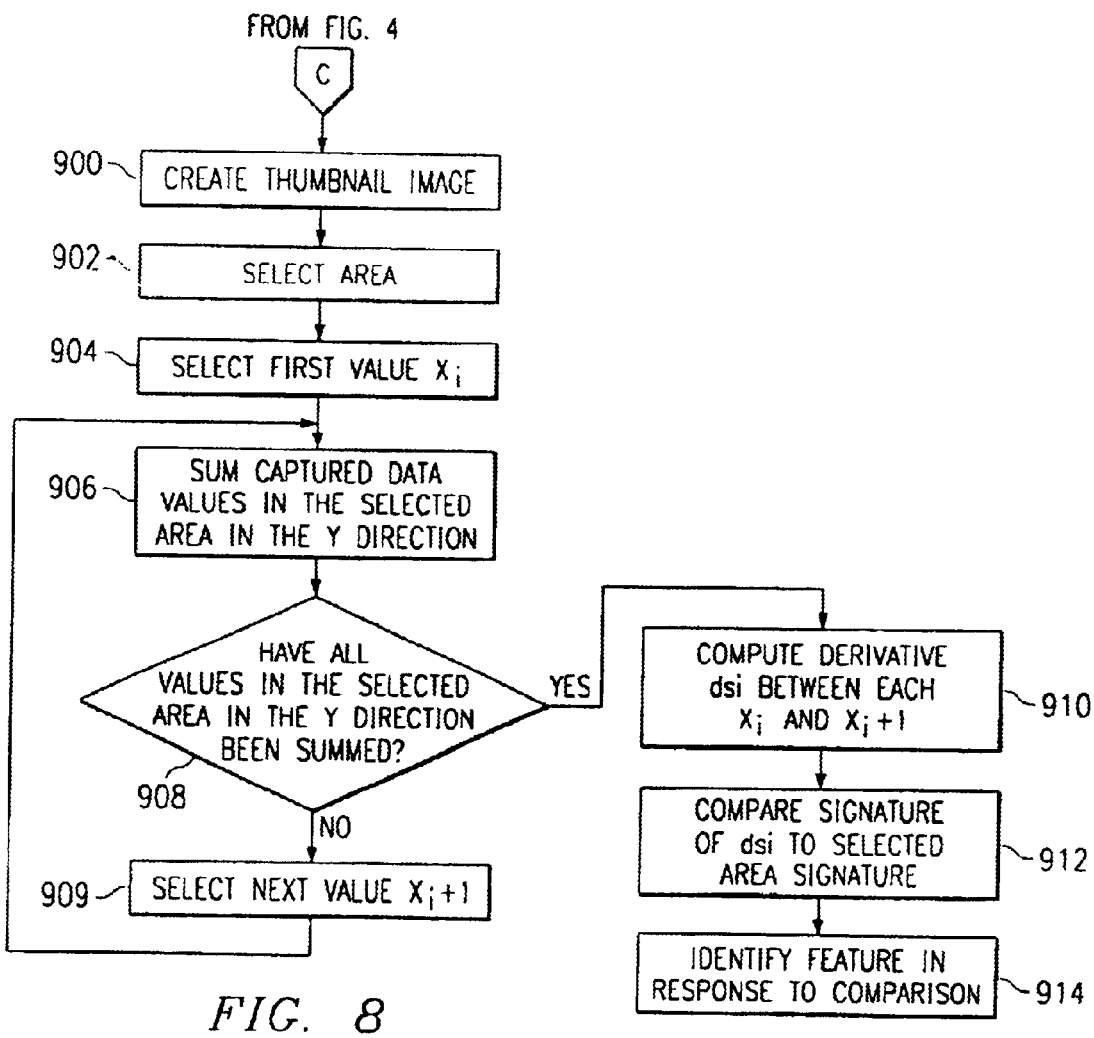
FIG. 8 illustrates another example of a method for locating an unexposed region of film while it is developing, utilizing the teachings of the present invention.

FIG. 8 illustrates an example of a method for locating an unexposed region of film in accordance with the present invention. Although the method is illustrated as separate steps, various steps may be ordered in other logical or functional configurations, or may comprise single steps. Image capture engine 34 may perform the method after all image data has been captured from film 60, whether captured or received by image capture engine 34. Alternatively, or in addition, image capture engine 34 may perform these steps while capturing data from film 60.

The method begins at step 900, where image capture engine 34 creates a thumbnail image $TN_1$ from the total captured image data, by one of a number of known methods. For example, image capture engine 34 may decimate the total captured image data from film 60 by some desirable factor, such as eight. Thumbnail image $TN_1$ then comprises roughly 1/64 of the total captured image data from film 60. This reduction of data through creation of thumbnail image $TN_1$ may be desirable in some applications. For example, it may increase computing efficiency and reduce computing time and/or processing resources for locating image extents. As another example, it may improve the accuracy of the location of an unexposed region.

In step 902, the method then selects an area in which data was captured from film 60. These areas, as previously discussed in conjunction with FIG. 2, include image areas $I_1$–$I_n$ and an unexposed region such as $R_t$. Data captured within image areas $I_1$–$I_n$ may be used to locate one or more unexposed regions $R_u$, while unexposed regions $R_t$ may be used to locate one or more sprocket holes 76.

In steps 904–908, the method then creates a representative data column $I_{F(X,n)}$ with which to perform the remaining steps of the method. These values are obtained across at least a portion of length L of film 60. These values may be a single row of pixels in the x direction, or representative values derived from a plurality of pixel rows. In step 904, image capture engine 34 selects a first value $x_i$, which represents an ith pixel within a single pixel row captured across length L in the x direction.

Image capture engine 34 then may optionally sum each of the ith pixel data values in the y direction in step 906 to create a representative data value for $x_i$. In step 908, image capture engine 34 determines whether or not all values in the x direction have been summed. If not, in step 909, image capture engine 34 selects the next value $x_{i+1}$ and then repeats the summing step in step 906 for the $x_{i+1}$ pixel data values in the y direction. If all values in the x direction have been summed in step 908, image capture engine 34 proceeds to step 910. Summing each of the ith pixel data values in the y direction in step 906 may also be advantageous in some applications. For example, it may increase accuracy in computing efficiency for location of features such as sprocket holes 76, and/or reduce computing time and/or processing resources.

In step 910, image capture engine 34 computes a pairwise rate of change, or derivative $d_{si}$ between each representative value $x_i$ and $x_{i+1}$ determined in steps 904–908. These pairwise rates of change may be compared with expected signatures from an unexposed region, and then used to derive the location of the unexposed region. Derivative $d_{si}$ may be computed by using a number of known methods.

In step 912, image capture engine 34 compares $d_{si}$ with a signature for an unexposed region. This comparison may be made using a number of methods, such as edge detection filters or masks. One such filter or mask may include a Marr-Hildreth edge detector.

While specific values for a signature of an unexposed region vary according to a number of parameters, each unexposed region may have a generally recognizable signature. For example, in commercial films unexposed regions $R_u$ are typically regularly shaped and/or spaced along the x direction of film 60, and occurrences thereof may appear generally similar, and at a generally periodic interval. For example, the rates of change measured for data captured across each unexposed region $R_u$ result in a large positive peak as data values increase when leaving an image frame followed by a similarly large negative peak as data values decrease when entering an image frame.

This pattern may generally be repeated at the location of each unexposed region $R_u$. The generally flat region represents an area within unexposed region $R_u$, where the data is generally not changing bounded by the positive and negative peaks at each edge. In some applications, this generally flat region may be of a predetermined size, such as for commercial films 60, where unexposed region $R_u$ may be generally similarly sized.

A variety of statistical methods may also be used to determine an expected signature for an unexposed region. For example, image capture engine 34 may calculate a mean and/or standard deviation for sizes and/or repetition intervals for unexposed regions $R_u$ and/or image frames. These statistics may be gathered within prior values that have previously been determined, and an appropriate threshold may then be determined for each peak and/or flat region, a spacing therebetween, and/or a repetition interval. These prior values may also have been determined from similar films 60, various views, a prior sensor station at another film development time, and the like. In addition, statistics may be used to eliminate anomalous data that may be due to factors such as non-uniformities of applied developer chemicals, light leakage, flares, scratches, and the like.

In step 914, image capture engine 34 determines the location of an unexposed region in response to the comparison. The location of the unexposed region may be identified in a variety of ways. For example, image capture engine 34 may identify the location as a center of the flat region, and/or use the peak locations to delineate the selected location. On the other hand, image capture engine 34 may also utilize offsets to more precisely locate the unexposed region where, for example, there are inaccuracies in the data capture process such as misalignment or noise. This value may also reduce inaccuracies caused by slower-than-normal rates of change, which may be due to factors such as light leakage when the image data was originally captured on film. These offsets may be calculated as predetermined values, statistical variations thereof, and/or from various views, sensor stations, and the like.

Image capture engine 34 may also use any type of data structure or method such as objects, tables, or arrays, to keep track of data values, peak and flat region values, repetition patterns, and the like. These values may also be denoted by tracking the positions of these values in graphical form. Any type of data structure may also be used for the captured image data, image frames, and/or unexposed regions.

While the invention has been particularly shown by the foregoing detailed description, various changes, substitutions, and alterations may be readily ascertainable by those skilled in the art and may be made herein without departing from the spirit and scope of the present invention as defined by the following claims.

Figure 9:
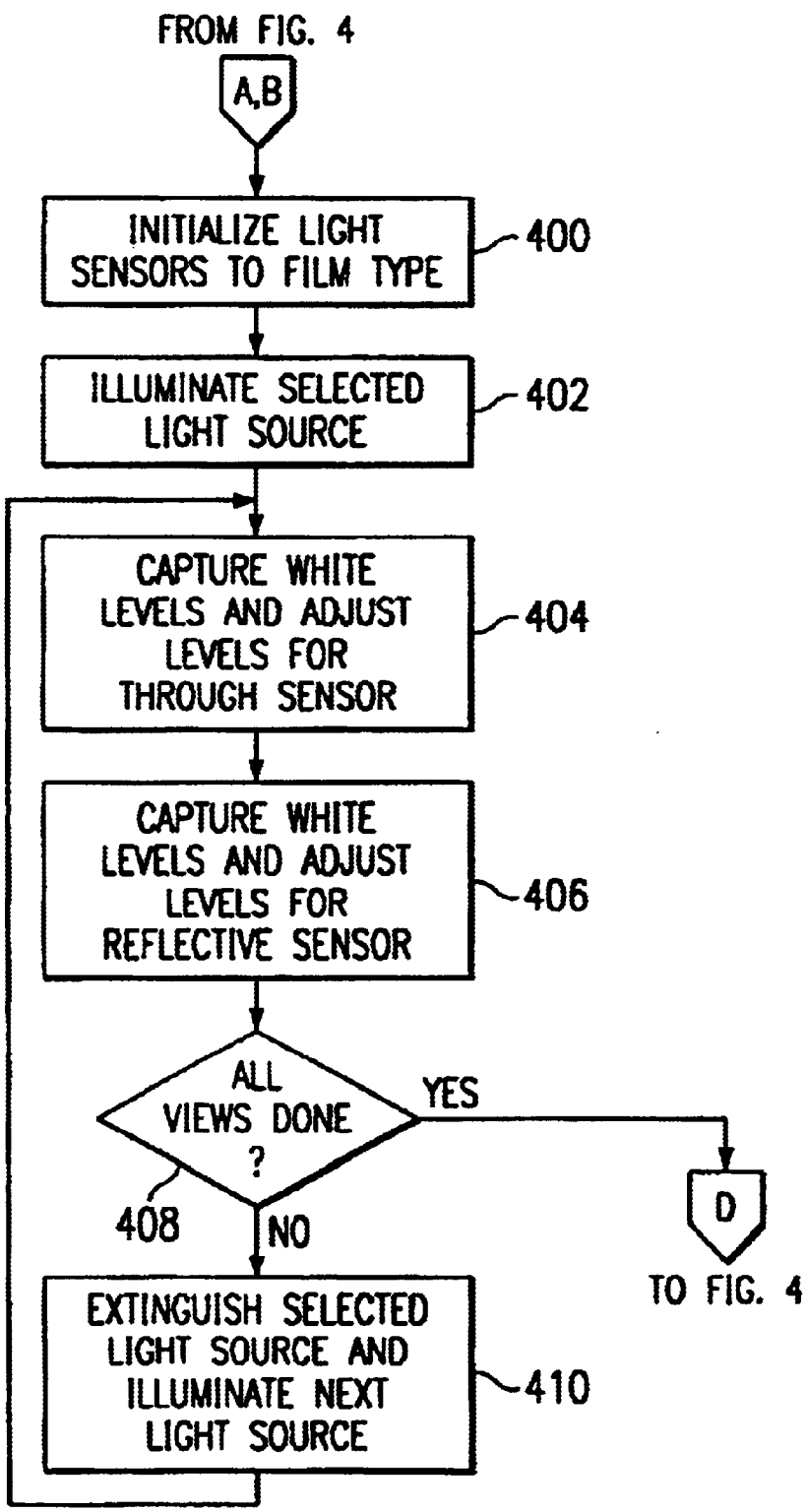
FIG. 9 illustrates an example of a method for adjusting the dynamic range of an image capture system in accordance with the present invention.

FIG. 9 illustrates an example of a method for adjusting the system dynamic range in accordance with the present invention. Generally, higher illumination levels are desirably used as films become denser because these films result in lower pixel values for image data. On the other hand, using higher illumination levels with less dense films may result in sensor saturation. Thus, image capture engine 34 desirably adjusts its dynamic range to that of the film by measuring white levels in one or more unexposed regions of film 60 in an effort to accommodate variations in film density. For example, image capture engine 34 may determine an initial estimate for dynamic range by using the leader of film 60, as discussed in FIG. 4. Image capture engine 34 may also update this initial estimate using one or more additional unexposed regions of film 60 as desired, and then adjust image data using the estimate and any updates thereto.

In addition, because characteristics of film 60 typically affect light differently when illumination originates from a top light source 50 and a bottom light source 51, it may be desirable for image capture engine 34 to utilize a plurality of sensors. In some applications, sensor stations 40 and 41 may be desirably utilized to provide a plurality of sensor views. These views may be used to capture reflective and through transmission paths of illumination from light sources 50 and 51 to obtain various aspects of a latent image in film 60. These views may provide the advantage of capturing additional data to establish and update estimates of dynamic range and non-uniformities within image capture engine 34, which may improve the accuracy of the image data and thus the signal-to-noise ratio of each digital image.

Sensor stations 40 and 41 may be used to obtain four views of an image in film 60. A first view maybe obtained by illuminating light source 50 and measuring energy levels within sensor 52 as it captures light reflected from film 60. Approximately simultaneously, sensor 53 may also capture image data as light from light source 50 is directed through film 60. Light source 50 may then be dimmed and light source 51 may be illuminated to obtain third and fourth views captured by light reflected from film 60 by sensor 53, and light illuminated through film 60 by sensor 52. In embodiments where light sources 50 and 51 utilize different frequencies, four views may also be obtained without dimming either light source. White levels may also be captured for each of these four views, and be used for subsequent image data adjustment as discussed in conjunction with step 316.

The method begins at step 400, where light sources 50 and/or 51 may be optionally initialized to a selected film type. If a type of film 60 is not known, then each of light sources 50 and/or 51 may be set to a nominal value, or a setting for a densest film to be expected. Initialization of one or both light sources 50 and/or 51 may avoid initial saturation of sensors 52 and 53. In step 402, image capture engine 34 activates light source 50, thus illuminating top portion 64 of film 60.

In step 404, image capture engine 34 adjusts through sensor 53 to receive signals through film illuminated with light source 50. Image capture engine 34 activates sensor 53 and measures energy levels within sensor 53 as it captures light illuminated through film 60 for an integration time. Generally, where simultaneous or near-simultaneous captures of through and reflective views are used, a reflective sensor will measure higher signals than a through sensor, because a through sensor receives illumination through film 60, which decreases its signal levels. These energy or signal levels typically decrease with increases in density of film 60, density of developer, and the dark levels contained within a latent image frame.

Then, where simultaneous or near-simultaneous captures of through and reflective views are used, image capture engine 34 desirably adjusts the through sensor to measure signal levels just below saturation. Image capture engine 34 may perform the adjustment by controlling effective illumination levels, generally by one of three methods. Image capture engine 34 may adjust the pulse width for a light source, adjust the amplitude of the pulse for a light source, and/or adjust an integration time of the sensor. Image capture engine 34 then in step 406 adjusts the reflective sensor 52 accordingly to avoid saturation.

Image capture engine 34 may use any suitable combination of adjusting illumination levels and sensor integration times in steps 404 and 406. Generally, increased illumination levels may in some applications be used with decreased sensor integration time to achieve an effective illumination level, and vice versa. For example, it may be desirable to maintain the same illumination output level for light source 50 while adjusting sensor 52 where image capture engine 34 adjusts a pulse width or amplitude for light source 50 until the signal from sensor 53 just begins to saturate. In this case, image capture engine 34 may then slightly adjust the integration time for sensor 52 to measure just below saturation. Alternatively, image capture engine 34 may desire a specific duration for imaging window T. In this case, image capture engine 34 may adjust an integration time for sensor 53 to measure just below saturation, and then adjust a pulse width or amplitude for light source 50 until the signal from sensor 52 measures just below saturation.

In step 408, image capture engine 34 determines whether all views have been established. If not, image capture engine 34 reverses the adjustment process for light source 51. For example, in step 410, image capture engine 34 dims light source 50 and illuminates light source 51. Image capture engine 34 returns to step 404 to measure levels for an integration time for sensor 52, the through sensor for light source 51. Image capture engine 34 may adjust the pulse width or amplitude for light source 51 and/or the integration time for sensor 52 until the signal from sensor 52 just begins to saturate. Image capture engine 34 may then slightly decrease the pulse width or amplitude for light source 51 so that sensor 52 measures just below saturation, and, in step 406, image capture engine 34 adjusts reflective sensor 53 to just below saturation.

The method also contemplates the use of any plurality of views. For example, one additional sensor may be used to create six views, and/or two additional sensors may be used to create eight views. It is also within the scope of the invention to use different numbers of views where a plurality of sensor stations is disposed in the x direction. The number of views may be selected automatically or manually, and may vary within image capture engine 34 as needed. Where more than one view is used, image capture engine 34 desirably obtains data from film 60 for all of the views within imaging window T. For example, where six views are used, imaging window T is desirably determined to accommodate suitable time for each sensor to capture data from each associated light source, and optionally for dark current levels to be captured.

Image capture engine 34 also may optionally capture the white levels for sensors 52 and 53 during steps 404–410. In step 412, image capture engine 34 may optionally determine a gain factor for each view to be used in adjusting image data for each view, as discussed in step 316.

Figure 10:
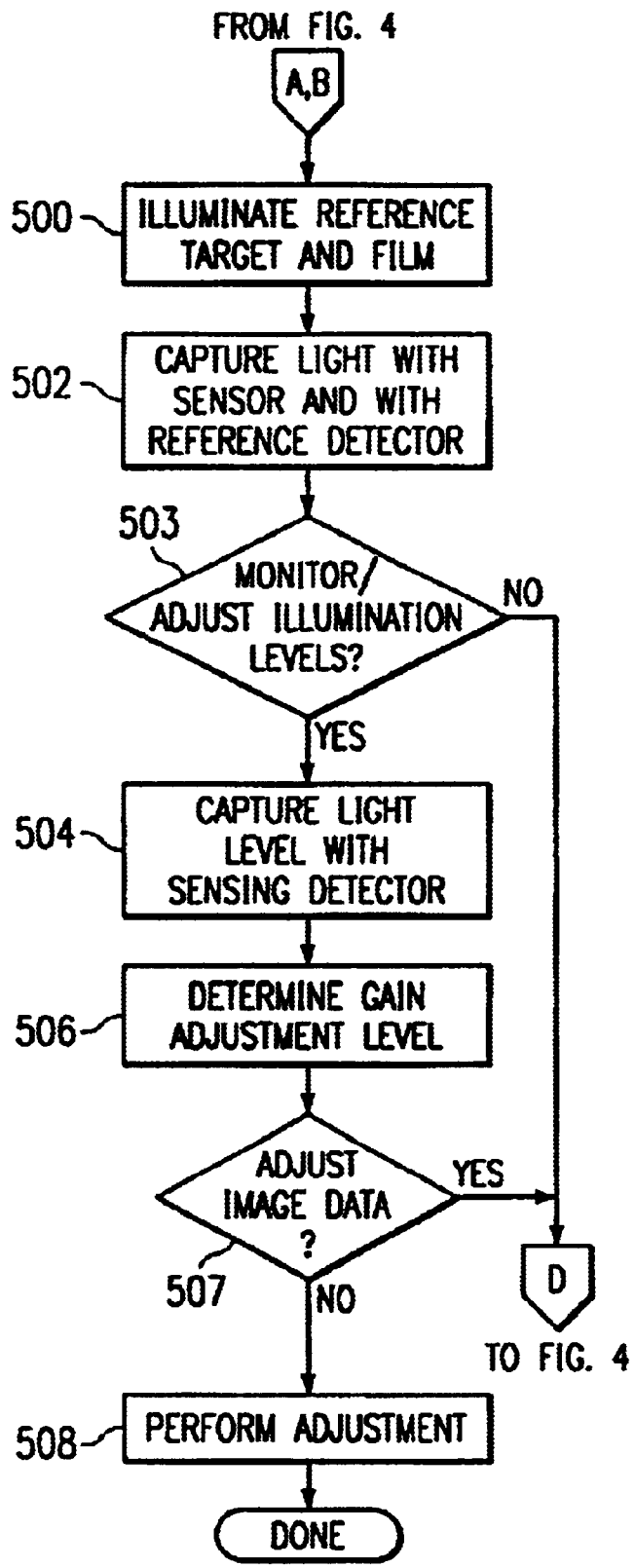
FIG. 10 illustrates an example of a method for monitoring and adjusting illumination of an image capture system utilizing the teachings of the present invention.

FIG. 10 illustrates an example of a method for monitoring and adjusting illumination of an image capture system utilizing the teachings of the present invention. While sensor station 40 is used to illustrate this aspect of the invention, the method discussed in conjunction with this FIG. 10 may be used with a plurality of sensor stations and/or views. Image capture engine 34 may selectively perform the method using some or all of these sensor stations as desired.

Generally, where a spatial non-uniformity of light source 51 does not appreciably change between imaging windows T, the non-uniformities in the y direction within a generally linear array of detectors may be assumed to drift up or down together between capture of image columns in the x direction. It may be desirable for image capture engine 34 to use a reference target 62 to continually monitor illumination levels as image data is obtained in the x direction between each imaging window T. Image data may be adjusted in response to these levels as they change between data columns. This may desirably allow image capture engine 34 to operate independently of content and/or unexposed regions within film 60. It may also ensure that illumination is generally uniform or varies within a small range between each imaging window T.

In some embodiments of the invention, image capture engine 34 may also utilize this information to adjust effective illumination levels before each image window T. In some cases, image capture engine 34 may adjust illumination levels by measuring one or more prior pulses of light source 50 and adjusting its power output to a desirable level. Alternatively or in addition, image capture engine 34 may also adjust image data in step 316 in response to the measured illumination levels.

The method begins in step 500, where light source 50 illuminates film 60 and reference target 62 as illustrated in FIG. 2. Reference target 62 is desirably disposed near film 60 and may be imaged with one or more suitably located detectors whose field of view is limited to a portion thereof (reference detectors). For example, reference target 62 may be disposed adjacent to each side of film 60, or at any sprocket holes therein, as shown in FIG. 2. Any suitable reference target may be used that is desirably reasonably and uniformly reflective of the wavelength of light source 50, and whose dynamic range is within the expected range of weakest to strongest signals expected from the range in film types. Such a reference target 62 may desirably reduce the possibility of sensor saturation that may result from gain adjustments of the weakest and/or strongest signals. The reflectivity of reference target 62 may remain the same or may change from sensor station to station. For example, reflectivity for reference target 62 for a last sensor station disposed in the x direction may desirably be decreased relative to a first sensor station where film 60 comprises developing film. As film develops, its density increases and it captures more light as the density of silver increases. Therefore, reference target 62 may approximate the varying levels of illumination received by a sensor reflected from a developing film whose density changes.

In step 502, image capture engine 34 may utilize sensor 52 to capture data from film 60, and one or more reference detectors (not explicitly shown) to capture reference energy levels from reference target 62. Because reflective and transmissive properties of reference target 62 typically do not vary appreciably, image capture engine 34 may use data captured by each reference detector as a reference level. Image capture engine 34 may utilize this reference level to apply gain to subsequent latent image data captured to compensate for slight variations in illumination levels or drifts within the detectors. Such an advantage may minimize the presence of signal noise and may stabilize image capture engine 34 to the extent that detector response variations caused by spectral bandwidth shifts of illumination combined with detector responsivity are relatively constant as a function of wavelength.

One or more reference detectors may be included within sensor 52, or be disposed proximate to sensor 52. In one embodiment, where reference target 62 may be disposed adjacent to each side of film 60, one or more reference detectors in a generally linear array sensor 52 may be used to capture image data from reference target 62. For example, where sensor 52 comprises 4096 detectors, a first plurality of reference detectors representing pixel zero through 128 may be used to image a first portion of reference target 62. Detectors 129 through 3966 may be used to capture data from film 60, and reference detectors 3967 through 4095 may be used to capture data from second portion of reference target 62. Other configurations for reference detectors may also be utilized. For example, reference detectors within sensor 52 may be used to image reference target 62 through one or more sprocket holes 76 of film 60. Because these reference detectors are subject to similar heating and noise characteristics of image capture engine 34, they are desirably similar in responsivity and characteristics such as noise, dynamic range, etc. to the detectors within sensor 52. Such reference detectors also desirably provide a generally true estimate of the energy levels measurable by sensor 52.

In one embodiment of the invention, image capture engine 34 may average data captured by each plurality of reference detectors to estimate a drift in illumination. Alternatively or in addition, image capture engine 34 may also use a weighted average of several prior estimates, from prior data columns. Image data adjustment may use these data to correct for illuminator drift in the x direction in addition to and/or independently of data used to correct for sensor non-uniformities in the y direction.

In step 503, image capture engine 34 may optionally determine whether to monitor and/or adjust illumination levels in steps 504–508. This may be desirable where illumination power of light source 50 drifts within a tolerance that may be less than some noise threshold, such as total system noise, or desired noise floor, etc. In some applications, such as where drifts are larger than this tolerance, image capture engine 34 may adjust image data in step 316 as discussed previously. In steps 504–508, image capture engine 34 may optionally adjust light sensor 50 to relatively uniform illumination levels within some tolerance before image capture engine 34 captures additional data, and/or adjust image data as discussed in step 316.

In step 504, image capture engine 34 may capture the current illumination level of a light pulse using sensing detector 61. For example, as a data column is captured, nominal energy levels for detectors within sensor 52 are typically modulated with detector variances. That is, although the energy level values may be the same, detector variances may not be separable from illumination variances. Thus, normalization of both detector variances within sensor 52 as well as illumination variances for light source 50 may be desirable. Any suitable configuration for a sensing detector 61 may be used that provides a reasonably true estimate for the optical power output levels for an integration time during a pulse from light source 50 without capturing additional ambient or reflected light. For example, sensing detector 61 may be mounted on light source 50. Image capture engine 34 may then utilize the sensor, camera and/or illumination drift data measured from the sensing detector 61 and/or reference detectors to adjust image data. Alternatively or in addition, image capture engine 34 may adjust sensor integration times, and/or light source amplitude or pulse width levels before the next pulse from light source 50 in response to this data.

In step 506, image capture engine 34 calculates the drift in the illumination level of this pulse from a prior light pulse level, and determines an appropriate gain that, if desired in step 507, may be used to adjust image data in step 316 as discussed previously. Image capture engine 34 may utilize a variety of methods to calculate a gain suitable to maintain a relatively constant total illuminated power from one pulse to the next. For example, where a drift in the illumination level is larger than the tolerance, image capture engine 34 may not stabilize total illuminated power from one pulse to the next. On the other hand, where the drift is smaller than the tolerance, image capture engine 34 may attempt to determining an appropriate operating point or desired light level for light source 50. Image capture engine 34 may utilize the gain to adjust light source 50. Alternatively or in addition, if data adjustment is desired in step 507, image capture engine 34 may adjust image data in step 316, as discussed previously.

Image capture engine 34 may then apply this new gain level to each pixel of image data captured from one or more subsequent data columns to correct for the drift in illumination. Alternatively, the new gain may be represented as a gain factor. Depending on the gain factor used, adjustment may be performed by, for example, multiplying the gain factor by the captured image data. The new gain level may be calculated by a variety of known methods, using pixel values, illumination levels, or a combination thereof.

For example, image capture engine 34 may measure a desired light level as a pixel value of 2233 (where each pixel comprises twelve (12) bits of resolution). The desired pixel value may be a predetermined value, or an averaged value. The desired pixel value may be an average of all prior reference detector values measured in the x-direction. In some applications, the new gain may be obtained by calculating the ratio of the desired value over the measured value. This gain is then multiplied by the actual measurement of each detector to produce a constant reference value and normalize the entire column to the reference. Thus, where reference detectors measure a lower light level such as 2230, the new gain value will be 2233/2230. Similarly, where reference detectors measure a higher light level such as 2235, the new gain value will be 2233/2235.

In step 508, image capture engine 34 may utilize discrete feedback from one or more prior pulses to determine an operating point for a next pulse. In some applications, illumination control 43, processor 36, or a combination of the two, may be used to deliver an input signal to light source 50. Unlike continuously sampled light levels, controlling the output illumination power of a next pulse by sampling output illumination power of a prior pulse presents challenges. For example, image capture engine 34 typically may not both sample the pulse and/or adjust the same pulse. Additionally, output optical pulse levels are somewhat independent from the input electrical power pulses during thermal transient periods, and thus maintaining a stable input signal to light source 50 may not necessarily insure a stable output illumination level. Thus, image capture engine 34 may desirably average measured illumination levels for prior pulses to establish a desired illumination level for the next pulse. Image capture engine 34 may utilize many types of averaging algorithms, including but not limited to, weighted averages, and infinite or finite impulse response algorithms.

What is claimed is:

1. A system for processing film comprising:
   an applicator operable to coat a developer solution to the film;
   a first light source operable to illuminate the coated film with a first light;
   a first sensor having sensor non-uniformities, the first sensor operable to measure the first light from an exposed and an unexposed portion of the coated film to produce corresponding exposed image data and unexposed data; and
   a processing system coupled to the first sensor and operable to determine a first set of non-uniformity data using the unexposed data and adjusting the exposed image data in response to the first set of non-uniformity data.

2. The system of claim 1, wherein the processing system also operates to:
   dim the first light source for at least a portion of the time that the first sensor measures the first light from the unexposed region of the coated film;
   capture a second set of unexposed data while the first light source is dimmed to determine a second set of non-uniformity data; and
   adjust the exposed image data obtained from the coated film in response to the second set of non-uniformity data.

3. The system of claim 1, wherein the first light measured by the first sensor comprises light transmitted through the coated film.

4. The system of claim 1, wherein the first light measured by the first sensor comprises light reflected from the coated film.

5. The system of claim 1, wherein the first light measured by the first sensor comprises light reflected from and through the coated film.

6. The system of claim 1, wherein the first light comprises infrared light.

7. The system of claim 1, wherein the first light comprises light within the visible portion of the electromagnetic spectrum.

8. The system of claim 1, further comprising a second light source operable to illuminate the coated film with a second light, and the first sensor is operable to measure the second light from the coated film.

9. The system of claim 8, wherein the first sensor measures the first light reflected from the film and measures the second light transmitted through the film.

10. The system of claim 8, wherein the first light comprises visible light and the second light comprises infrared light.

11. The system of claim 1, wherein the processing system operates to normalize the exposed image data.

12. The system of claim 1, wherein the exposed image data is adjusted using a gain factor determined in response to an actual maximum pixel value derived from the measurements from the first sensor.

13. The system of claim 1, wherein the system is embodied in a self service film processing kiosk.

14. A method for estimating sensor and illumination non-uniformities, comprising:

capturing a first plurality of readings to determine a first set of non-uniformity data from a first sensor operable to capture light reflected from film illuminated by a first light source while the film has a developer chemical applied thereto, the first sensor responsive to light reflected from an unexposed region of film; and adjusting image data obtained from the film in response to the first set of non-uniformity data.

15. The method of claim 14, further comprising:

dimming the first light source for at least a portion of the time that the first sensor is being used to sense the unexposed region of the film;

capturing a second plurality of readings from the first sensor while the first light source is dimmed to determine a second set of non-uniformity data; and adjusting image data obtained from the film in response to the second set of non-uniformity data.

16. The method of claim 15, wherein the second plurality of readings is captured from a dry uniform target other than film.

17. The method of claim 14, wherein the first light source utilizes one of the group consisting of the infrared spectrum, the nonvisible spectrum, and the near-infrared spectrum.

18. The method of claim 14, further comprising:

capturing a plurality of readings from each of a plurality of sensors responsive to light reflected from a plurality of unexposed regions of the film to determine additional non-uniformity data, the plurality of sensors each operable to capture light reflected from the first side of the film at a different development time of the film illuminated by at least one of the plurality of light sources; and adjusting image data obtained from the film in response to the additional non-uniformity data.

19. The method of claim 14, further comprising adjusting the image data using a gain factor determined in response to an actual maximum pixel value derived from the readings from the first sensor.

20. The method of claim 19, wherein the gain factor is determined by:

generating a histogram comprising an actual maximum pixel value in response to the readings;

determining a set point where a quantity of the first plurality of readings exceeds a threshold; and determining the gain factor in response to the set point.

21. The method of claim 14 wherein the first plurality of readings is captured from a dry uncoated portion of the film.

22. The method of claim 14 where the first plurality of readings is captured from a dry, uniform target other than film.

* * * * *